(12) United States Patent
Levin et al.

(10) Patent No.: US 9,002,378 B2
(45) Date of Patent: *Apr. 7, 2015

(54) METHOD AND SYSTEM FOR ESTIMATION OF MOBILE STATION VELOCITY IN A CELLULAR SYSTEM BASED ON GEOGRAPHICAL DATA

(71) Applicant: Nice-Systems Ltd., Ra'anana (IL)

(72) Inventors: Moshe Levin, Tel-Aviv (IL); Avraham Freedman, Tel Aviv (IL)

(73) Assignee: Nice-Systems Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,489

(22) Filed: Oct. 8, 2013

(65) Prior Publication Data

US 2014/0106776 A1    Apr. 17, 2014

Related U.S. Application Data

(63) Continuation of application No. 13/108,555, filed on May 16, 2011, now Pat. No. 8,588,808, which is a continuation-in-part of application No. 12/848,572, filed on Aug. 2, 2010, now Pat. No. 8,131,312, which is a continuation-in-part of application No. 12/786,173, filed on May 24, 2010, now Pat. No. 8,200,244.

(51) Int. Cl.
*H04W 64/00* (2009.01)
*H04W 4/02* (2009.01)
*G01S 5/02* (2010.01)
*G01S 11/02* (2010.01)
*H04W 28/04* (2009.01)

(52) U.S. Cl.
CPC ............ *H04W 4/028* (2013.01); *G01S 5/0252* (2013.01); *G01S 5/0294* (2013.01); *G01S 11/026* (2013.01); *H04W 28/04* (2013.01); *H04W 64/006* (2013.01)

(58) Field of Classification Search
CPC .................................................... G01S 5/0252
USPC ................ 455/456.2, 456.1; 342/461, 357.35
See application file for complete search history.

(56) References Cited

U.S. PATENT DOCUMENTS

2009/0096637 A1*  4/2009  Olson et al. .................... 340/993
2011/0199255 A1*  8/2011  Murray et al. ............ 342/357.23
2011/0199260 A1*  8/2011  Garrett et al. ............ 342/357.35

* cited by examiner

*Primary Examiner* — Phuoc H Doan
(74) *Attorney, Agent, or Firm* — Pearl Cohen Zedek Latzer Baratz LLP

(57) ABSTRACT

A system and method for estimating velocity of a mobile station in a wireless communication system using time-frequency signal processing and a geographical database. The geographical database is used for prediction of ray trajectory and ray power to provide an estimate of propagation delay associated with database points.

6 Claims, 22 Drawing Sheets

METHOD AND SYSTEM FOR ESTIMATION OF MOBILE STATION VELOCITY IN A CELLULAR SYSTEM BASED ON GEOGRAPHICAL DATA

CROSS-REFERENCE TO RELATED APPLICATIONS

This application is a continuation application of U.S. patent application Ser. No. 13/108,555, filed May 16, 2011, which in turn is a continuation-in-part application of U.S. patent application Ser. No. 12/848,572, filed Aug. 2, 2010, which in turn is a continuation-in-part application of U.S. patent application Ser. No. 12/786,173, filed May 24, 2010, all of which are incorporated in their entirety herein by reference.

FIELD OF THE INVENTION

The present invention relates generally to environmental modeling, and in particular to calibration of an environmental model using wireless signals.

BACKGROUND OF THE INVENTION

Accurate location of mobile terminals, e.g. mobile telephones, in a wireless system, for example, a cellular telephone communication system, has been a difficult challenge. Several techniques have been proposed and partially developed to address this problem, but there remains a need for a technique with greater precision of location. It is generally desirable that such a location system be relatively low cost, require little or no modification to existing user hardware and software, and not disrupt operation of the communication system.

Prediction of received signal strength of signals from mobile terminals that may be operating in actual environments may be a difficult task. A source of difficulty may be a lack of available information about a propagation environment, at least in a precision that may be required for an accurate application of a theory of wave propagation, e.g. electromagnetic wave theories presented by James Clerk Maxwell. This lack of information may be inherent in a modeling problem as a propagation environment may be changing dynamically, and also may be random in nature. An assumption may be made of a certain physical model and may not be directly related to an actual physical environment. It is generally desirable that such a model be based more on signal strength measurements from an actual environment.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
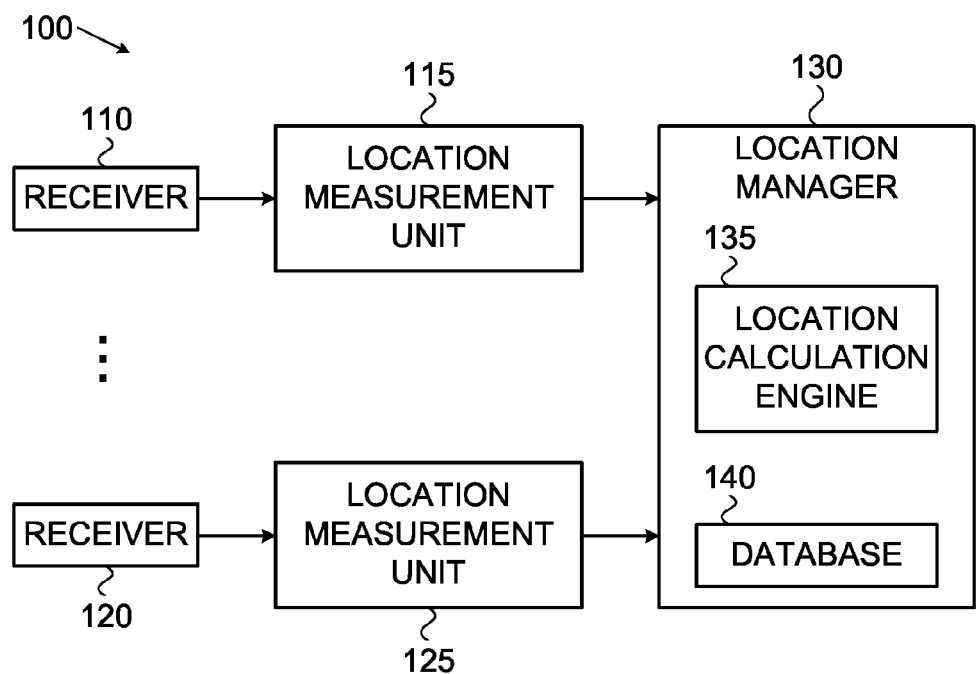
FIG. 1a depicts an exemplary block diagram illustrating a system according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a base station, a modem, a wireless modem, a Personal Computer (PC), a desktop computer, a mobile computer, a laptop computer, a notebook computer, a tablet computer, a netbook computer, a server computer, a handheld computer, a handheld device, a Personal Digital Assistant (PDA) device, a handheld PDA device, any consumer electronic device, a network, a wireless network, a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.16, 802.16d, 802.16e, 802.11a, 802.11b, 802.11g, 802.11n standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Interim Standard 95 (IS-95), Multi-Carrier Modulation (MCM), Discrete Multi-Tone (DMT), Bluetooth®, ZigBee™, or the like. Embodiments of the invention may be used in various other apparatuses, devices systems and/or networks.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

According to embodiments of the present invention, the location, e.g., probably point or vicinity area, of a mobile device, e.g., a mobile communication device such as a mobile phone, may be determined by receiving signals transmitted from a device during communication with a base station. According to embodiments of the invention, one or more devices for reception of signals from mobile communication devices may be deployed in a geographic region. As described herein, according to some embodiments of the invention, the devices may be passive, or receive-only devices, with no transmission capabilities; according to other embodiments of the invention, the devices may have some transmission capabilities, but not necessarily transmission capabilities required to transmit throughout a cell region with mobile communication devices therein; according to yet other embodiments of the invention, the devices or their functionality may be combined with a base station.

In existing mobile communication systems, mobile communication devices may transmit signals substantially omnidirectionally. Signals from a mobile communication device, e.g. a wireless transmitter, may alternately be transmitted with directional information. A variety of methods may be available for directionally transmitting signals. These omni-directionally transmitted signals, or directional signals, may be received by two or more receiver devices according to embodiments of the invention. Each receiver may be connected, either wired or wirelessly to measuring devices that may determine properties of received signals transmitted by mobile devices, for example, the strength of a received signal, e.g., RSSI, signal power, signal-to-noise ratio, etc. Measuring devices may be connected to or associated with a management and calculation device that may process received signals and other information that may be generated from the received signals, from a plurality of receivers covering a region. Processing of the information may include a determination of a set of locations where a transmitter may be spatially positioned based on timing information from one or more than one receiver device. Additionally or alternatively, processing may include using techniques to reduce a set of possible locations to a smaller set of one or more likely locations of the wireless transmitter.

Signals may be received at an antenna that may be directional, and, for example, properties of an antenna may be used to determine a received signal direction by comparing a relative received signal strength to properties of an antenna, e.g., a main lobe boresight versus sidelobes of an antenna. Received signals that may include directional information may be received by receivers connected to measurement devices for additional measurements, e.g. power measurements, and may be used substantially as described herein. Calculations and a determination of a location may include directional information obtained from signal and/or antenna properties, or other received properties that may include directional information.

Reference is made to FIG. 1a, which is a schematic depiction of a system 100 according to an embodiment of the present invention. The system may include a plurality of receivers 110, 120, and optionally other receivers (not shown), respective location measurement units 115, 125, and optionally other location measurement units (not shown), a location manager 130, which may include a location calculation engine 140, and a database 140. It will be understood that the figure is a schematic diagram, and that components or modules depicted as separate may be combined, and single depicted components may be divided into more than one component, etc. within the scope of the present invention.

The receivers 110, 120 may receive signals transmitted by a wireless device in their mutual proximity. Receivers 110, 120, may be independent devices, or they may be connected to an element of a communications infrastructure, e.g. a base station. It will be recognized that a system may include some independent and some dependent receiver devices. A receiver may include an antenna, a coupling device, amplifiers, and other radio frequency (RF) devices and modules used for signal reception and processing. A receiver may be physically or virtually connected to or associated with an element of a communications infrastructure, e.g., a base station, where a virtual connection may make use of existing communications infrastructure antennas and other devices to receive signals.

A receiver may receive a signal and send it to a location Measurement Unit (LMU) 115 and 125. A receiver 110 may be connected to and/or associated with a respective location measurement unit (LMU) 115. It will be recognized that LMU 115 may be located proximate to and/or form a part of receiver 110, or LMU 115 may be located at a location remote from receiver 110. Receiver 120 may be connected to respective LMU 125 in a similar fashion. LMUs 115, 125 may perform RF signal processing and/or other tasks that may be use to determine properties of received signals, e.g., a received signal power or other parameter that may be used to assist in location determination.

LMUs 115, 125 may be connected in any suitable fashion to location manager 130. Location manager 130 may be located at remote location or may be located at or proximate to one or more LMUs. Location manager 130 may be connected to LMUs by a wired or wireless connection. Location manager 130 may use signal-related information provided by a plurality of LMUs, e.g., 115, 125, to determine one or a set of possible or probable locations of a wireless transmitter whose signals have been received by receivers 110, 120. Location manager 130 may be able to distinguish a wireless transmitter from one or more other wireless transmitters that may be transmitting within range of an antenna and receiver 110. Location Manager 130 may include a network, network component, a server and a processor.

Location manager may include a location calculation engine 135, wherein location calculation engine 135 may form a part of a location manager 130 or be operably connected to a location manager 130. Location calculation engine 135 may include sub-units (not shown) for performing its functions, e.g., a processor, a memory, a communication module, and other elements used for receiving data from LMUs, performing calculations, and communicating calculation results. Location calculation engine 135 may calculate a position or set of positions of a wireless transmitter by one or more methods, e.g. time of arrival, time of difference of arrival, ray tracing, or other methods, based on the signal received at a receiver device, measured at LMU and communicated to location manager.

Location manager may include or be operatively associated with database 140. Database 140 may be accessed by location calculation engine 135, which may use data obtained therefrom as inputs to location calculations. Database 140 may contain terrestrial feature information pertaining to the geographic region of interest associated with the operative receiving areas of receivers. The terrestrial features may include data pertaining to objects and other features that may affect signals transmitted by mobile devices and received by receivers, e.g., man-made buildings, structures or other features, and/or natural features, e.g., mountains, etc. Data pertaining to terrestrial features may include location and height of obstacles, and may additionally include detailed information that may further describe features, e.g., a material or materials associated with the feature, which may affect signal reception by receiver. Other data pertaining to terrestrial features may be size and dimensions of the feature, and additional feature elements, such as protrusions and the like. Terrestrial feature information may be static, or may be time dependent, for example during a certain period of a year snow may cover a portion of a natural feature, e.g., a mountain. Each feature may have associated with it one or more RF properties and/or effects it may induce onto RF signals during propagation through or near each feature. Location calculation engine 135 may use such feature-related RF propagation information to reduce an error of a calculation of a location of a wireless transmitter.

According to an embodiment of the invention, receiver devices may include the substantial receiving functionality of a base station, for example, a cellular system base station operating in a receive-only mode, referred to herein as a passive receiver. Passive receivers may be based on a simplified chipset, e.g., a femtocell chipset. In some embodiments of the invention, for purposes of simplicity, the passive receiver need not include all hardware of a base station, for example, the passive receiver may be connected to an existing antenna and/or a power amplifier, such those forming part of a cell base station. A passive receiver may receive signals that may be transmitted by mobile stations while having little or no effect on the normal performance of a base station. Signals received at the passive receiver from a mobile device may be may be decoded, and the receiver may measure a signal strength of the received signal and/or a time of arrival of a received signal. As described herein, a receiver positioned in a communication system employing greater bandwidth may allow for more precise location measurement. Thus, for example, a third generation Universal Mobile telecommunications System (UMTS) system, may use a signal having a wide bandwidth, thereby allowing for increased resolution of range measurements by the system according to embodiments of the present invention.

In an embodiment of the invention, a code division multiple access (CDMA) signal may be used, e.g., UMTS, and may be received by a receiver, which may include, for example, a Rake receiver. A receiver, e.g. a Rake receiver, may, for example receive a signal that may have rays that may be associated with spectral lines that may be received. A delay of each finger output of a Rake receiver may include a delay of each ray that may arrive at a receiver and/or a power of each ray. A system may be, for example a fourth generation system, e.g., long term evolution (LTE) or Worldwide Interoperability for Microwave Access (WiMAX), which may be expected to use a wide bandwidth and a full measurement of a spectral channel response may be available, and delays and/or power of impinging rays may be estimated. A system, e.g. a third or fourth generation system, may be equipped with an antenna system that may include an array of antennas, and may be used to provide a spatial signature, for example a direction of one or more impinging rays.

An embodiment of the invention may use a database, e.g. a geographical database that may include terrain information, building information, road information, land use information, and/or other geographical feature information. Such a database may be used for prediction of a ray trajectory and/or prediction of a ray power of one or more rays, and may be used to determine an estimation of a propagation delay that may be associated with each point source, as well as a propagation delay spread. A ray trajectory may be determined by a variety of methods, for example, ray tracing. A signal strength at any point may also be estimated, and may correspond to a measure of an error in an estimation that may be based on a prediction.

An embodiment of the invention may use data pertaining to time of arrival (TOA), time of difference of arrival (TDOA), or another property of a signal from the mobile device to one or a plurality of receivers to form an estimate of a location of a mobile device. Received signal strength information may be utilized to refine a location estimate, and may be integrated into a location estimation process. For example, in the event the signal is received by a plurality of receivers, the time of arrival data may be looked up in the database, and a loci of possible locations may be determined for each receiver. A set of intersection points of the loci may further narrow the possible locations. Thus, for example, a TOA method of localization may be based upon intersections of loci, where such loci may be equidistant, and may be from several devices. Such loci may be formed from a set of propagation delays that may be measured by receivers, and may be from each device. An intersection may be determined of a locus of all points at a first measured distance from a first device, a locus of all points at a second measured distance from a second device and, optionally, a locus of all points at a third measured distance from a third device, etc. It will be recognized that the degree of precision or disambiguation may increase with the number of receivers. Measurements may or may not be precise, and additional measurements may be used to contribute to increasing an accuracy of a result.

Figure 1B:
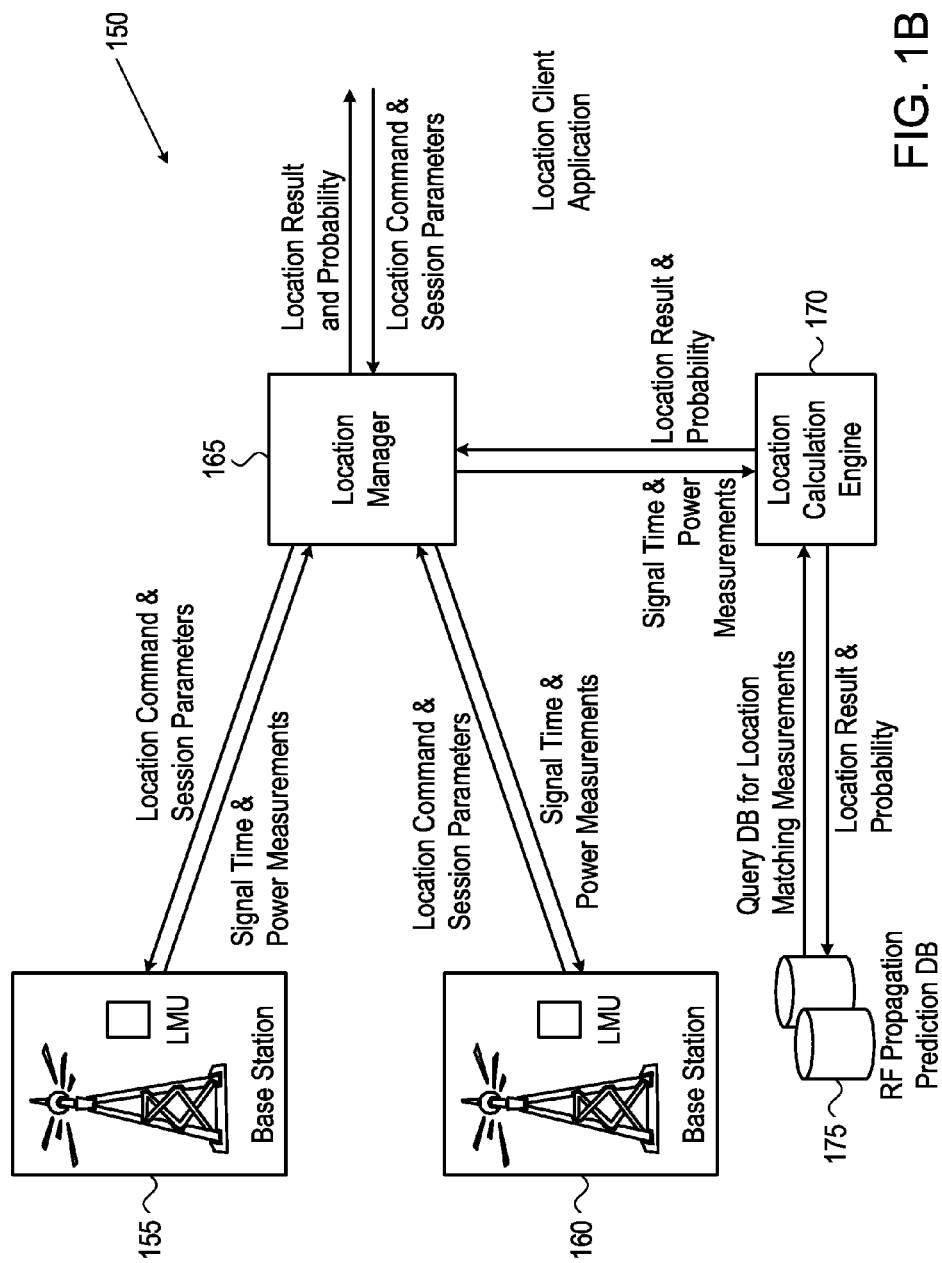
FIG. 1b depicts an exemplary block diagram illustrating a system according to embodiments of the present invention.
Figure 9:
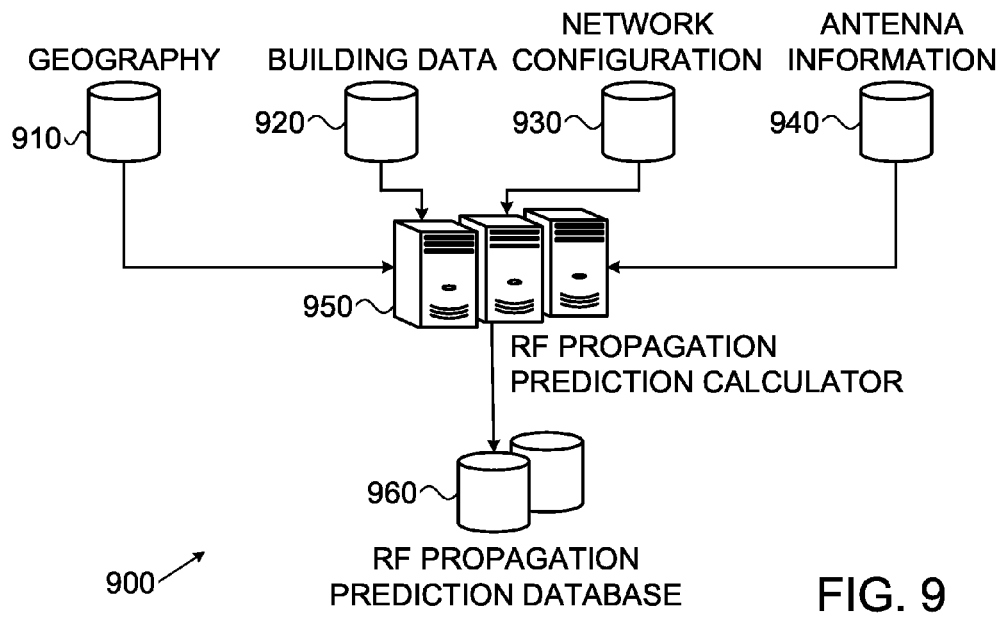
FIG. 9 depicts an exemplary block diagram illustrating an embodiment of a system according to embodiments of the present invention.

Reference is made to FIG. 1b, which is a schematic depiction of an alternate arrangement of a system 150 according to embodiments of the invention. A system may be controlled by a Location Manager 165 that may receive location command and session parameters from a Location Client Application. Session parameters, which may include a mobile station identification, may be transferred to location measurement units (LMU), which may be installed at base station sites 155, 160, and may be connected to base station antennas. Measurement units may perform time of arrival measurements, for example single or multiple readings, and signal strength measurements. An LMU 165 may also decode mobile station messages and may extract measurements that may be performed by a mobile unit, e.g. time advance measurements, signal strength measurements during handover, etc. Time and power measurements may then be transferred from one or more LMUs to a Location Manager 165, which may transfer them to a Location Calculation Engine 170. A Location Calculation Engine 170 may perform location calculations, and may estimate a location accuracy, or alternatively a probability of a location within a predefined error. Such results may be returned to a Location Manager 165, which may return these results back to a Location Client Application. An exemplary embodiment of the invention may be to use an RF prediction database 175, as may be described below, and shown by exemplary schematic FIG. 9. A database may be created during a pre-processing stage, and may reduce a load of calculations that may be required in real time. An RF prediction may use a geographical database which may include terrain height and/or land use information, building data which may include building contours and/or height, network configurations which may include locations of a plurality of the base stations 155, 160 and/or LMUs, and may include locations of all of the base stations 155, 160 and/or LMUs, and antenna information which may include height, type and/or orientation of each antenna. An RF prediction calculator may create a large database that may cover an entire coverage area of a system, e.g. a cellular system. Such a database may be a three dimensional database, which may include in-building bins in various floors. For each bin, a database may include a list of rays from each LMU and each base station 155, 160, as described below. Sensors may be all single-reading, and a database may be compressed to contain a single range plus delay spread information. A multi-reading sensor, or sensors, may be used and compression may be made according to a signal resolution number of measurements that may be provided by sensors. Upon reception of a query, a location engine may search a database for a best fit of one or more range vectors and/or one or more signal strength vectors for a received set of measurements.

Figure 2:
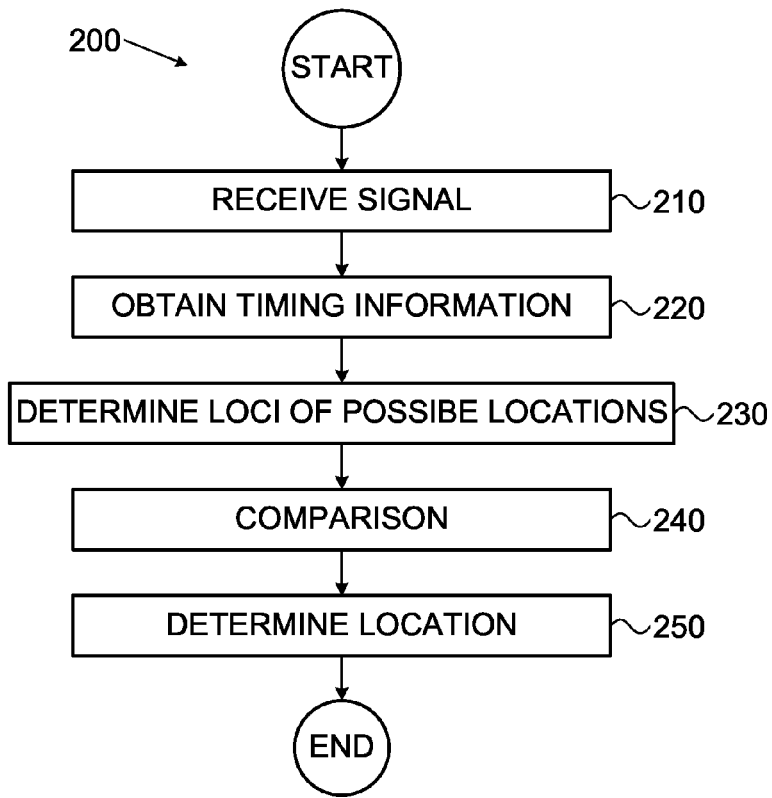
FIG. 2 depicts a method according to embodiments of the present invention.

An embodiment of a method for determining a location of a wireless transmitter 200 may be described by reference to FIG. 2. Signals may be received 210 by receivers and measurement devices. Signals may be received by antennas that may be connected to receivers, and antennas may be directional or omni-directional. Signals that may be received may be used to obtain timing information 220. Timing information may be obtained by several methods, e.g. autocorrelation peak detection, early-late gate or edge detection. Timing information may be used in conjunction with received signal strength information, or other metrics, or used alone. Timing information may be collected at fixed or variable intervals, and may depend on system factors, e.g. whether a transmitter may be moving or stationary. Other methods, e.g. use of a high-accuracy clock or system clock, may be used to provide accurate timing information. Loci of possible locations of transmitters may be determined 230 by processing timing information (e.g., by TOA or TDOA), or by correlating with other signal indicators, e.g. signal strength. A comparison may be made 240 to stored parameters and may be used to reduce a number of possible locations of a transmitter. Stored parameters may be terrestrial features or artificial structure features, e.g. building features. Stored parameters may also have been determined from measurements of signals from wireless transmitters that may have been at known locations during transmission. Such stored parameters may be stored in a database, and may be accessible by a processor searching a database. A comparison 240 may be an optional process in some embodiments, and using loci of possible locations that may have been determined 230 may be sufficient to determine a location or possible set of locations of a transmitter for an application. A location of a wireless transmitter may be determined 250 by a location manager, as described herein. A location determination 250 may be made from possible loci, comparison to a database, triangulation, or other like methods, or a combination thereof.

Figure 3:
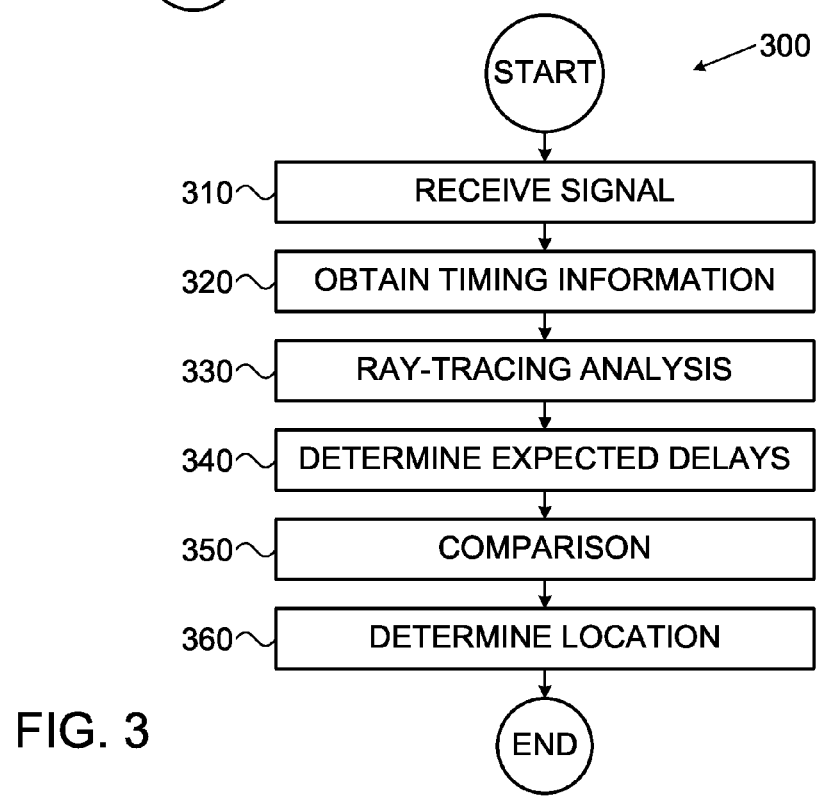
FIG. 3 depicts a method according to embodiments of the present invention.

Another embodiment of a method for determining a location of a wireless transmitter 300 may be described by reference to FIG. 3. Signals may be received 310 by receivers and measurement devices. Signals may be received by antennas that may be connected to receivers, and antennas may be directional or omni-directional. Signals that may be received may be used to obtain timing information 320. In some embodiments signals may have directional information that may be extracted, for example CDMA signals that may be received by correlation receivers may use an output of a receiver, e.g. a Rake receiver, to determine path propagation information. Correlator outputs from fingers of a rake receiver may be used to determine power received from a ray, and an amplitude and/or time determination may be made. Timing information may be obtained by several methods, and may include RF receiver techniques, e.g. directional antennas, processing techniques, e.g. early-late gate or edge detection, other like techniques, or a combination thereof. Timing information may be collected at fixed or variable intervals, and may depend on system factors, e.g. whether a transmitter may be moving or stationary. Other methods, e.g. use of a high-accuracy clock or system clock, may be used to provide accurate timing information. A ray tracing analysis 330 may be used for analysis of signals that may have been received and outputs of correlation, or other like receivers. A ray tracing analysis 330 may include consideration of rays reflecting, diffracting, scattering, refracting, or other RF effects. A ray tracing analysis 330 may include determining a power, a distance travelled and/or an angle of arrival at a receiver. Expected delays of received signals may be determined 340 by using outputs of a ray tracing analysis. A determination of expected delays 340 may include TOA or TDOA information. Loci of possible transmitter locations may be determined from expected delays that may have been determined. A comparison may be made 350 to stored parameters and may be used to reduce a number of possible locations of a transmitter. Stored parameters may be terrestrial features or artificial structure features, e.g. building features. Stored parameters may also have been determined from measurements of signals from wireless transmitters that may have been at known locations during transmission. Such stored parameters may be stored in a database, and may be accessible by a processor searching a database. A comparison 350 may be an optional process in some embodiments, and using outputs of a ray tracing analysis 330 and a determination of expected delays 340 may be sufficient to determine a location or possible set of locations of a transmitter for an application. A location of a wireless transmitter may be determined 360 by a location manager, as described herein. A location determination 360 may be made from possible loci, outputs of ray tracing, comparison to a database, triangulation, or other like methods, or a combination thereof. Accuracy of a determination 360 may, in some embodiments, depend on resolution of rays that may be received by a receiver, e.g. a number of received rays from a transmitter. Algorithms may be used where elements, e.g. power, path length, predetermined or in situ determined irrelevant directions, may be applied to select a set of rays from all rays received, and accuracy of a location determination 360 may be improved.

In some embodiments a wireless transmitter may be in use on a GSM system. A transmitter may be in communication with a single base station. Another base station may be within RF signal range of a transmitter and may be choosing to ignore a transmitter that a base station is not providing communication services. A mobile station, or transmitter, may measure a radio, or received, signal strength (RSS) from neighboring base stations and may report a measurement to a base station that may be providing communication services and connectivity. A mobile station may be handed-off from a serving base station to another base station, for example to maintain continuous communication service during motion of a mobile transmitter. A hand-off process may include a base station measuring a time advance (TA), and a TA may be used as a range measurement. A TA that may be used as a range measurement may be a technique for determining loci of possible locations. RSS measurements that may be from a mobile station and TA measurements that may be from a base station, e.g. a serving base station, may be inputs to a location process, as described herein.

In other embodiments a wireless transmitter may be in use on a CDMA or a UMTS system. A transmitter may be in communication with a plurality of base stations, and may have a plurality of base stations that may be providing connectivity and communication services, e.g. serving base stations. A mobile transmitter may be handed from a base station to another by a dynamic hand-off process, e.g. a soft handover. In such an embodiment a plurality of base stations may report propagation delay information to a location manager in a simultaneous, or nearly simultaneous, fashion, each doing so as described herein. Additional information that may be obtained from a plurality of base stations reporting information relevant to a transmitter may be used to reduce errors or ambiguities of location determinations. In some embodiments, some reporting may occur more frequently than other embodiments, e.g. a CDMA system may report more frequently than a UMTS system.

Other embodiments may have LMUs that may be dedicated devices configured for receive-only operation. Such LMUs may have a capability of a base station, and may be configured to receive signals from both transmitters that a host base station may in communication with and also other transmitters that may be within range but not in active communication. Signals that may be received from each transmitter within range may be used to determine timing information and/or range information, as described herein. RSS measurements may also be determined from each transmitter within range. An LMU may be part of a communication system, or may be connected to a communication system with, for example, a shared antenna. An LMU that may share an antenna may be connected in a fashion so as to not disturb a communication system, but rather tap a signal from an antenna. A device may be used to facilitate such signal sampling, e.g. a signal or power coupler. An LMU may also be connected to a dedicated antenna.

Figure 4:
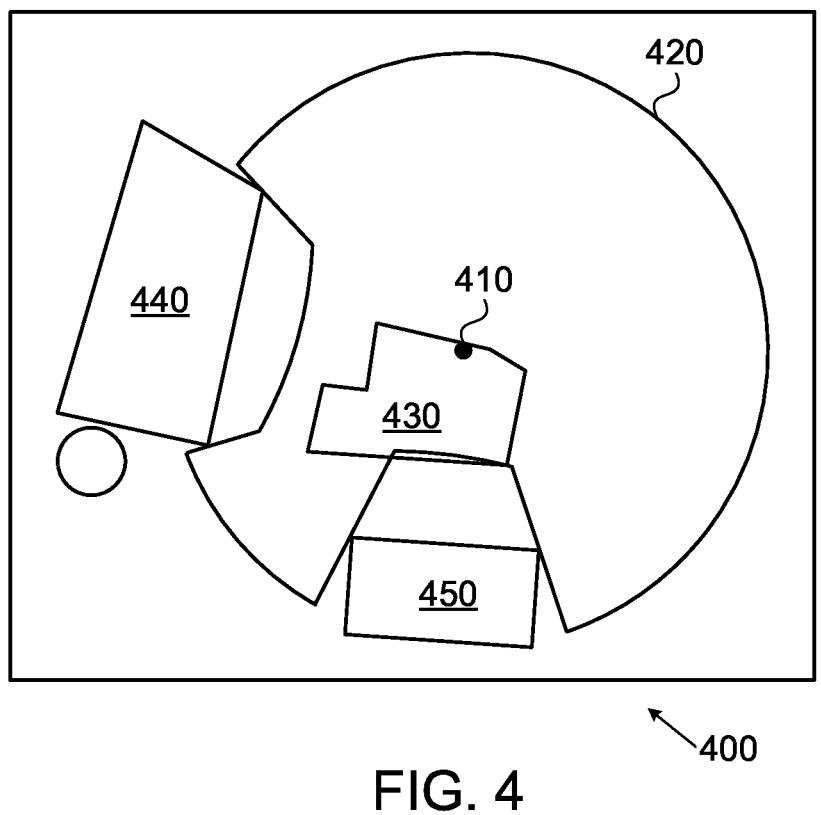
FIG. 4 depicts an exemplary diagram according to embodiments of the present invention.

Loci of equidistant points in free space may be depicted as circles. Loci of points in an environment, for example a build up environment 400, may be comprised of one or more circles that may be distorted, and may be described by reference to FIG. 4. A base station 410 may have an equidistant locus 420 around it, and such a locus may be shown as a two-dimensional locus for pictorial convenience. A base station 410 may be installed on a top of a building 430. Other buildings 440 and 450 may be in a vicinity of base station 410, and may cause a distortion of an equidistant locus 420, and may result in a deviation from a free space circular shape. Distortions may be caused by a variety of effects on signal propagation. For example, a distortion may be caused by an inability of a signal to penetrate a structure in a case where there may be a greater amount of signal reflection from a structure than signal penetration.

An embodiment of the invention may use TDOA techniques. TDOA may be used where a transmission of a signal may be received, and may be recorded, at two or more devices, and an absolute time an event, for example a signal transmission, may occur may not be available to such receiver devices. A difference in a propagation delay may be available, may be significant, and may be more significant than an absolute time of a signal reception. A free space environment may have signals that may form a loci of points for which a difference in propagation delays between two or more receiver devices may be a constant, may be referred to as equi-difference loci, and may be hyperbolas. In an environment where obstacles, e.g. buildings may be present, a shape of such a hyperbola may be distorted, where such distortion may be a result of a presence of such obstacles.

Receiver devices may have a capability of measurement of arrival times of rays, or sets of rays of signals. An exemplary case of a UMTS system that may have a Rake receiver, or an exemplary case of a $4^{th}$ generation system, may be able to receive rays, where such rays may be separately received, and equidistant or equi-difference loci may be found for each of the rays. Such loci may be used to determine a single site location. For example, it may be possible to use this technique to determine a location of a mobile user, and such a determination may be made by using data that may be obtained from a single device or receiver. A 4$^{th}$ generation system may have receivers and/or mobile devices that may be equipped with one or more antenna arrays. Single site location techniques may be implemented using information from a single ray, for example, by combining TOA techniques with Angle of Arrival (AOA) techniques. Such a combination of techniques may also be used to enhance an accuracy of a location estimation.

An embodiment of the invention uses a trilateration principle that may rely on TOA information. In a free space environment, a propagation delay, $T_i$, may be a time of a signal from a moment of transmission until reception. A propagation delay may depend on a geometrical distance between a transmitter and a receiver, and may be given by $$T_i = \frac{1}{c}|r_m - r_i| = \frac{1}{c}\sqrt{(x_m - x_i)^2 + (y_m - y_i)^2 + (z_m - z_i)^2}$$

where $r_m$ may be a coordinate vector of a mobile device that may be given in, for example, a Cartesian coordinate system by $(x_m, y_m, z_m)^\tau$, and $r_i$ may be $r_i = (x_i, y_i, z_i)^\tau$, where $r_i$ may be a coordinate vector of an i$^{th}$ measurement device. A speed of light may be represented by c, e.g. c=3×10$^8$ meters per second. A propagation delay, $T_i$, may be measured directly by a receiver, and a loci of all points, $r_m$, that may be at a distance $cT_i$ from an i$^{th}$ measurement device may be a sphere of a radius $cT_i$ and may be centered at a receiver location $r_i$. An intersection of a plurality of spheres, e.g. 4 spheres, may determine a location of a mobile station in space unambiguously.

Propagation delay may be measured directly in an embodiment where a time of transmission may be known at a receiver. Synchronization may be necessary between a transmitter and a receiver, and such synchronization may not always be available, in particular when sensors may be used that may be external to a communications system, e.g. a cellular system. Such sensors may not necessarily be synchronized with a system on which it may operate in conjunction. In some embodiments such sensors may be synchronized among each other, and not necessarily synchronized with a system, and such sensors may comprise receivers that may measure times of arrival of a same transmission to each of them. $T_i$ may denote a time of arrival of a transmission that may be transmitted at an unknown time, $T_{tx}$, with respect to a system clock. A time of arrival may be found by $$T_i = T_{tx} + \frac{1}{c}|r_m - r_i| = T_{tx} + \frac{1}{c}\sqrt{(x_m - x_i)^2 + (y_m - y_i)^2 + (z_m - z_i)^2}$$

An absolute time of arrival may be biased, with an unknown $T_{tx}$, and a difference between any two times of arrivals, $\Delta\tau_{i,j}=T_i-T_j$ for any pair (i,j) a constant bias may be cancelled out. In free space, a locus of a plurality points that may form a given time difference $\Delta\tau_{i,j}$ may be a spatial half-hyperboloid, for which receiver locations, $r_i$ and $r_j$ may be foci. An intersection of four such hyperboloid surfaces may provide an unambiguous location of a mobile station. This may constitute a method of Time Difference of Arrival (TDOA).

In some embodiments, a propagation medium, an atmosphere and obstacles, e.g. buildings, vegetation and other objects, may interact with propagating electromagnetic waves. A propagation of radio waves for scenarios applicable to, for example, cellular technologies has been studied, experimented, and described in text books and researches. Physical phenomena that may be involved when an electromagnetic wave may interact with matter may be absorption, refraction, reflection, diffraction and/or scattering. In a case where an electromagnetic wave propagates through matter some of its energy may be absorbed by such matter. This may be referred to as an absorption phenomenon. In a case where a wave may hit another matter, some of its energy may be reflected back, some of its energy may be transmitted through into another material, and may have another propagation direction. Each of these effects may be referred to as reflection and refraction, respectively. An amount of reflected energy and/or transmitted energy, as well as a direction of a transmitted wave may depend on actual properties of materials at an interface. If a wave may encounter an obstacle the wave propagation may be affected by a size of one or more obstacles, and may be in addition to being affected by a material. An obstacle may be larger than a wavelength of a signal, and a wave may pass around an obstacle, by, for example, diffraction. If a wave's length may be larger than an obstacle, a wave may be perturbed and it may scatter in a plurality of directions.

An exemplary embodiment of the invention comprises wireless communications, e.g. cellular communications, that may operate in frequencies that may be between approximately 700 MHz and 3000 MHz, and may be wavelengths that may range between 40 cm and 10 cm. A propagation medium may be lower layers of an atmosphere, and obstacles may be a ground, buildings and/or vegetation. Link distances may be between a few tens of meters and a few kilometers, or other ranges. A propagation phenomena that may relate to this case may be reflections from a ground and walls, diffraction around buildings and/or scattering from vegetation and from structures, e.g. buildings, which may be, by order of magnitude of tens of centimeters. Effects of absorption and/or refraction may be negligible. A resulting channel propagation model that may describe a resulting waveform may be a multipath channel. In such a model a radiating wave may undergo a set of reflections, that may be by buildings, walls etc. At a receiver a direct signal, that may not be obstructed, may be received together with delayed versions of it, which may propagate via reflection and/or diffraction at or around obstacles. Multipath may be considered in some applications as a destructive effect, which may deteriorate an accuracy of measurements. A further deterioration in some applications may be attributed to a shortest path taken may indicate a line of sight, e.g. a non-obstructed path.

An embodiment of the invention may use ray tracing techniques to predict different paths and a power of each ray, where a ray may be attributed to a propagating signal. A prediction may be used for measurement prediction estimation, and may be specifically for path prediction and location. Ray tracing may be performed by a number of known techniques, and may be based on a Uniform Theory of Diffraction (UTD). UTD may be a high frequency approximation to an exact solution of Maxwell equations in space. A spherical propagating wave may be described by a field intensity in space that may be given by:

$$\vec{E}(r, t) = \frac{\vec{E}_0}{|r|} \exp\left[j2\pi f\left(t - \frac{1}{c}i_k \cdot r\right)\right]$$

where $\vec{E}(r, t)$ may be a field vector in location r, as a function of time, $\vec{E}_0$ may be a field intensity at an origin, f may be a frequency of a wave, a vector $i_k$ may be a unit vector pointing to a wave propagation direction, and "·" may be a scalar product. According to a UTD model, an electromagnetic wave may be represented by a ray, in a direction of $i_k$. When a wave may reach an obstacle, it may reflect back from an obstacle surface, such that an angle between an incident ray and a surface may be equal to an angle between a reflected ray and a surface. An intensity of a wave may be given by a reflection coefficient, which may be a function of a type of material an obstacle may be made of and/or an orientation of electromagnetic field vectors that may be relative to an obstacle surface. Some energy of an incident ray may be reflected, and some of it may be absorbed within an obstacle. An obstacle may be thin, e.g. a building wall, and an electromagnetic wave may traverse a wall, and may still carry enough energy to be detected. Electromagnetic energy that may reach an obstacle may undergo diffraction and may reach a point behind an obstacle. An intensity of a diffracted field depends on an incidence angle of a wave, and may be relative to an obstacle edge and/or a diffraction angle, which may be an angle between a ray that may connect an obstacle edge and a point of measurement. A type of material and a shape of an obstacle may also make a difference for such a determination.

A ray tracing method may be described by referring to a ray launching method of implementation. In such a method, energy radiated from a source may be partitioned into rays, each traveling in a radial direction outgoing from it at a given spatial angle $(\theta,\phi)$. Each ray may represent a spherical section wave of size $(\Delta\theta,\Delta\phi)$ and may carry a part of a radiated power $P_t$ that may be given by:

$$P_{ray}(\theta, \phi) = P_t G(\theta, \phi) \frac{\Delta\theta\Delta\phi}{4\pi} \frac{W}{m^2}$$

and may travel at a direction that may be given, e.g. in Cartesian coordinates, by $$i_{\theta,\phi} = i_x \cos\phi \cos\theta + i_y \cos\phi \sin\theta + i_z \sin\phi$$

where $G(\theta,\phi)$ may be the antenna directional gain at the spatial angle direction $(\theta,\phi)$.

A ray tracing algorithm may trace each ray that may start along its $i_{\theta,\phi}$ direction, and may change its path according to obstacles it may encounter. For example, an obstacle may be a planar surface, or an approximation of a planar surface by using a small area approximation of any surface, for which a direction vector, that may be perpendicular to a plane, may be given by $i_p$. A reflected wave field intensity may be described by:

$$\vec{E}_r(r-r_0) = \frac{\vec{E}_r(r_0)}{|r_0| + |r-r_0|} \exp\left[-j\frac{2\pi f}{c} i_r \cdot (r-r_0)\right]$$

where $\vec{E}_r(r-r_0)$ may be a reflected wave field vector at location $r$, and $r_0$ may be an incidence point. A dependence on time may be omitted for convenience, in some embodiments. A reflected wave direction vector $i_r$ may be given by:

$$i_r = (-i_i i_p)i_p - [i_i + (i_i i_p)i_p]$$

and its power may be given by:

$$\vec{E}_r = R^{\perp} \vec{E}_i^{\perp} + R \vec{E}_i$$

where $\vec{E}_i^{\perp}$ may be a field intensity component that may be perpendicular to a surface, and $\vec{E}_i$ may be a component that may be parallel to a surface. Reflection coefficients, $R^{\perp}$ and $R$ may be given by:

$$R^{\perp} = \frac{\sin(\Phi) - \sqrt{\eta - \cos^2(\Phi)}}{\sin(\Phi) + \sqrt{\eta - \cos^2(\Phi)}} \text{ and}$$

$$R = \frac{\eta\sin(\Phi) - \sqrt{\eta - \cos^2(\Phi)}}{\eta\sin(\Phi) + \sqrt{\eta - \cos^2(\Phi)}}$$

where $\eta = \in_r - j \cdot 18 \cdot 10^9 \sigma/f$ may depend on a material. $\in_r$ may be a relative dielectric constant of a material, $\sigma$ may be a conductivity of a material surface, and may be given in Siemens/m).

Similarly, for diffraction over a wedge of angle $n\pi$ a diffracted wave electric field $\vec{E}_d$ may be given by:

$$\vec{E}_d = \vec{E}_r \frac{\exp\left(-j\frac{2\pi f}{c}s_1\right)}{s_1} D^{\perp} \sqrt{\frac{s_1}{s_2(s_1+s_2)}} \exp\left(-j\frac{2\pi f}{c}s_2\right)$$

Where $s_1$ may be a distance of a diffraction point from a ray source, e.g. a wave radius of curvature, $s_2$ may be a distance of a diffraction point to a measurement source, $s_2 = |r - r_0|$. Diffraction coefficients may depend on a field orientation, and may be given by:

$$D^{\parallel}_{\perp} = \frac{-\exp(-j\pi/4)}{2h\sqrt{2\pi k}} \begin{Bmatrix} \cot\left(\frac{\pi + (\Phi_2 - \Phi_1)}{2n}\right) \cdot F(kLa^+(\Phi_2 - \Phi_1)) + \\ \cot\left(\frac{\pi - (\Phi_2 - \Phi_1)}{2n}\right) \cdot F(kLa^-(\Phi_2 - \Phi_1)) + \\ D_0^{\parallel} \cdot \cot\left(\frac{\pi - (\Phi_2 + \Phi_1)}{2n}\right) \cdot F(kLa^-(\Phi_2 + \Phi_1)) + \\ D_n^{\parallel} \cdot \cot\left(\frac{\pi + (\Phi_2 + \Phi_1)}{2n}\right) \cdot F(kLa^+(\Phi_2 + \Phi_1)) \end{Bmatrix}$$

where $F(x) = 2j\sqrt{x} \cdot \exp(jx) \int_{\sqrt{x}}^{\infty} \exp(-jt^2)dt$ may be a Fresnel integral, and:

$$L = \frac{s_1 s_2}{s_1 + s_2}$$

$$a^{\pm}(\beta) = 2\cos^2\left(\frac{2n\pi N^{\pm} - \beta}{2}\right)$$

$$\beta = \Phi_2 \pm \Phi_1$$

$$N^{\pm} = \text{round}\left(\frac{\beta \pm \pi}{2n\pi}\right)$$

where $\Phi_1$ may be an angle between an incident ray and a first surface of a wedge, and $\Phi_2$ may be an angle between an incident ray and a second surface of a wedge. A diffracted wave may not follow a single ray direction, as may be reflection from a planar surface, and may continue in a set of directions in a plane of an incident wave. Ray splitting may be required to follow further a wave's various paths.

Ray splitting may be used to describe scattering phenomena. As scattering may involve a distortion of a wave front, a ray may be split at a point of scattering to rays that may travel at different directions, where each may carry a smaller fraction of an electromagnetic power. An accuracy of a ray tracing technique may depends on a resolution that may be applied, for example a number of rays launched from a source, as well as rays that may be split at point of diffraction or scattering. A larger the number of rays may correspond to a higher total computation load, and heuristic trimming mechanisms may be typically applied to reduce them. Such methods may include trimming by power, by total path length, and/or by irrelevant directions, or other methods. A result of a ray tracing process may be a list of rays per possible reception point. For each ray a power it carries, a distance it may travel and/or an angle of arrival at a destination may be found. A reciprocity principle may allow a same process to be applied that may start from a receive point and may be toward a transmit point.

A resulting list of rays may be used to constitute a power delay profile and/or a power angle profile of a particular propagation channel. A power may be expected to be received as a function of delay and angle. Phase information of each ray may not be available as it may require geographical database accuracy on an order of magnitude of a fraction of a wavelength, e.g. about 1 cm accuracy or better for a typical cellular signal. A relative velocity between a mobile station and an environment may be known to calculate a phase accurately.

In an embodiment of the invention a range measurement may be made by a receiver, e.g. a cellular receiver. A signal r(t) may denote a received signal at a sensor. There may be a plurality of methods that may be used to measure a signal delay, and may be relative to a reference time. Accuracy, relative to a mean square error, of a delay measurement of a signal with bandwidth $B_f$, embedded in noise may be given by:

$$\sigma_d = \frac{1}{B_f \sqrt{SNR}}$$

where SNR may be a signal to noise ratio at which a signal may be received. $\tau_s = 1/B_f$ may be a basic resolution of a measurement. A signal, e.g. a cellular signal, that may pass through a multipath channel, may arrive at a receive antenna as a convolution of a transmitted signal s(t) and may be with a channel impulse response h(t), and may be together with noise:

$$r(t) = \int_{-\infty}^{\infty} s(t-\tau)h(\tau)d\tau + n(t)$$

A channel impulse response may be given by a multipath model as:

$$h(t) = \sum_{l=0}^{L-1} a_l \delta(t - \tau_l)$$

where $a_1$ may be a field intensity, that may include a phase of an $l^{th}$ ray, and $\delta(t-\tau_l)$ may be an impulse delayed by $\tau_l$. An angle dependence may affect a phase by which a signal may be received at each receive antenna, and may be ignored for simplification of a derivation.

A measurement process may be a de-convolution type process, which may be distinguished according to a signal transmitted and a receiver capability. In a case where a signal may be a narrow bandwidth signal, and may be defined as $1/B_f > \tau_i - \tau_j$ for each pair (i,j), various delays may not be resolvable. Each signal that may arrive at a receiver via different paths may interfere with each other and may result in a single signal, that may have an equivalent spread of:

$$\tau_{eq} = \sqrt{\tau_s^2 + \tau_{rms}^2}$$

where $\tau_{rms}$ may be a signal channel delay spread that may be given by:

$$\tau_{rms}^2 = \sum_{l}^{L-1} P_l \tau_l^2 - \tau_{avg}^2$$

where $$\tau_{avg} = \sum_n P_n \tau_n$$

may be an average delay, and coefficient $$P_l = \frac{|a_l|^2}{\sum_{l=0}^{L-1} |a_l|^2}$$

may be partial power in each ray, and may be normalized to the total power. A delay measurement accuracy may then be:

$$\sigma_d = \frac{\tau_{eq}}{\sqrt{SNR}}$$

Resulting from such interference, a received signal amplitude may not be constant, but rather may be a random variable, which may be distributed according to a distribution, e.g. a Rician distribution function, and may depend on whether a signal that may be received may have a significant line-of sight component. An average accuracy can be computed according to:

$$\overline{\sigma}_d = \int_0^\infty \tau_{eq} \exp\left(-\frac{r^2 + |a_0|^2}{2}\right) I_0(r|a_0|) dr$$

where $|a_0|$ may be an amplitude of a SNR of a first line of sight component, if it exists, and $I_0$ may be a Bessel function of a second kind of order 0. In a case of no direct line-of-sight signal existing, and a Rayleigh fading signal, may be produced, an average range measurement accuracy may becomes a constant, and may be independent of a SNR:

$$\tau_{eq} \sqrt{\frac{\pi}{2}}.$$

In an embodiment where a signal may be a wide bandwidth signal, some rays may be resolvable. A resulting response may be partitioned, for example into clusters. Each cluster may consist of a small number of rays. An accuracy of each cluster may be given by:

$$\sigma_d = \frac{\tau_{eq}}{\sqrt{SNR}}$$

where a channel delay spread per cluster may be calculated as per:

$$\tau_{rms}^2 = \sum_{l}^{L-1} P_l \tau_l^2 - \tau_{avg}^2$$

with L being a number of rays in a cluster. A resulting amplitude distribution may be a Rician distribution, however as a number of rays in a cluster may not be large, there may be a good probability that a strong reflection may dominate a received signal, and thus produce a Rician distribution that may have a larger K factor per cluster, which may further enhance an estimation accuracy of a delay of each cluster.

An exemplary embodiment of the invention may comprise operation in a system, for example a cellular system. A bandwidth of a first generation cellular systems, e.g. Advanced Mobile Phone System (AMPS) or a second generation digital AMPS (D-AMPS) system may be 30 kHz, and may provide a resolution power of approximately 33 microseconds. A received signal may resolve scatterers that may be separated by greater than 10 km. A range measurement capability in such systems may be poor. For a GSM signal, of which a bandwidth may be 200 kHz a receiver may resolve rays that may arrive at a 1500 m difference. An urban environment channel model may predict a delay spread of approximately 0.4 microseconds, which may result in an equivalent resolution of 1510 m. A line of sight non-dispersive channel, with a signal to noise ratio of 20 dB, may produce measurements with an accuracy of 150 m. A UMTS signal that may have a 5 MHz bandwidth, may have an expected resolution of an order of magnitude of 60 m. An expected $4^{th}$ generation system that may have a bandwidth that may range between 5 MHz and 40 MHz may achieve a 7.5 m resolution.

In an exemplary embodiment of the invention, a type and quality of a resulting measurement may depend on a sophistication of a sensor. At least three types of sensors may be distinguished. A first type may be a single reading sensor, which may return a single delay value, and may correspond to a shortest path, e.g. a line of sight, or a strongest reflection. A second type may be a multi-reading sensor, which may resolve and return several values, and may correspond to several cluster scatterers. This second type of sensor may be obtained, for example, from a UMTS rake receiver. A third type may be a multi-antenna sensor, which may have an antenna array. This third type of sensor may also estimate and resolve rays by angle of arrival.

Figure 5:
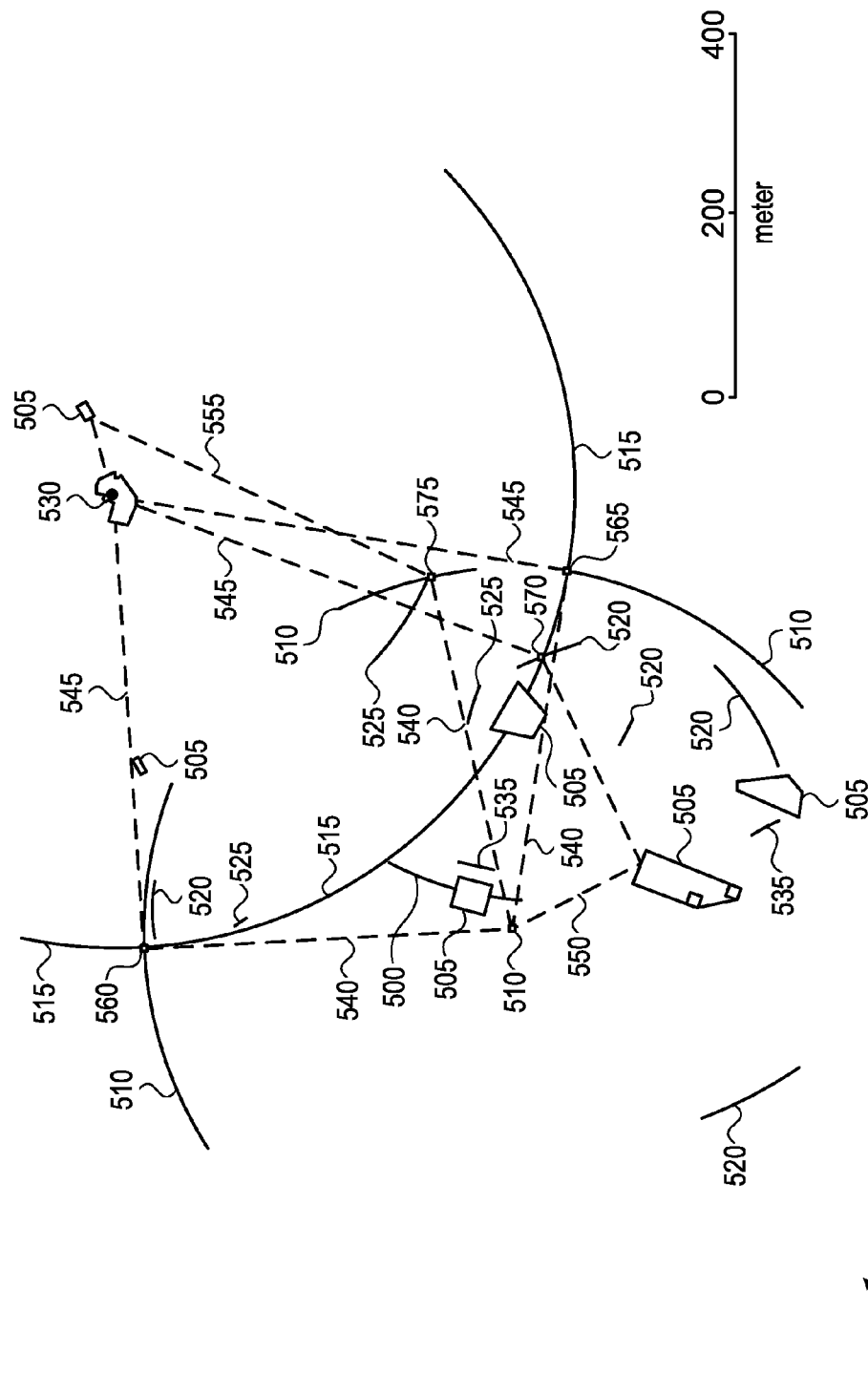
FIG. 5 depicts an exemplary diagram according to embodiments of the present invention.

Another embodiment of the invention may be a method of location estimation that may be based on ray tracing and/or results of ray tracing methods. From propagation delay measurements, that may be either single value or multi-ray values, a location may be found, as described above, by using a TOA method, for example, if delay measurements may be absolute, or by a TDOA method, for example, if measurements may be relative. A measurement value may be allocated to a direct ray, a reflected ray or a diffracted ray. A set of measurements that may be accumulated from one or a plurality of sensors may be used to find an exact location. Such a process may be explained by reference to FIG. 5, may be for two single range sensors, and may use a TOA method within a build-up environment 500. Building contours may be denoted by 505. Two sensors 510 and 530 may be used and may produce two readings, e.g. 400 m and 500 m respectively. An equi-range loci for two sensors for those measurements may also be determined. A resulting loci may not be continuous, and may be due to a presence of obstacles, and may comprise several non-contiguous segments. Segments that may be denoted by 510 may be direct line-of sight loci from sensor 510, and may lie on a circle around a sensor of which a radius may be 400 m. Segments that may be denoted by 520 may be a result of a single reflection from a potential mobile unit that may be located over a segment, and its transmission propagated through one of the buildings' walls, to a sensor 510. Similarly, segments denoted 535 may be loci of double reflection paths. Other loci that may result from diffraction, may also exist but may be omitted from the figure for clarity. A signal strength of a diffracted wave may be much lower than those received by reflections. An equi-distance, e.g. 500 m, locus of points from sensor 530 may comprise multiple segments. Segments 515 may be direct line-of sight loci, segments 525 may be single reflection loci and other segments may be double reflection loci. Intersection points of a locus, e.g. a 400 m distance locus, from sensor 510 with a locus, e.g. a 500 m distance locus, from sensor 530 may be a candidate location of a mobile unit. This exemplary depiction shows four such intersection points that may have been made. Two of those 560 and 565 may be a result of a direct ray intersection. Two other intersections 570 and 575 may be an intersection of a direct ray with a reflected ray. Direct rays from each sensor to those points may be depicted as well and denoted 540 and 545 respectively and reflected rays that may reach points 570 and 575 may be denoted by 550 and 555 respectively.

A difficulty of mobile location may be ambiguity. In an exemplary embodiment shown by FIG. 5 there may be four such ambiguous points. This difficulty may become more severe in a denser environment, and/or in a three dimensional scenario, that may include ground reflections. Several means may be used to resolve ambiguities. A first exemplary method may be to use additional sensors. An intersection of loci of several sensors may reduce a level of ambiguity. A determination may need to be made with regard to a number of sensors, and may or may not be made prior to an initial measurement. A second exemplary method may be use of a sensor that may be capable of angle measurements. Then an angle of arrival line may provide an additional indication of a correct location. A third exemplary method may be use of signal strength filtering. Although range may be a factor in a propagation loss calculation, a propagation path and phenomena, e.g. diffraction, scattering etc., may result in different signal strength values, for example for each sensor, at each candidate point. By ray tracing, it may be possible to determine dominant rays per point, and hence improve an accuracy of a signal strength estimation per candidate. An angle of arrival, even if not measured directly, may be considered as a signal strength spatial filter in a sense that signals that may arrive from a directional antenna boresight may be stronger than those that may arrive at different angles. Thus signal strength, in addition to a path loss, may be used to determine a correct location. Other methods, for example triangulation, may be used.

Figure 6:
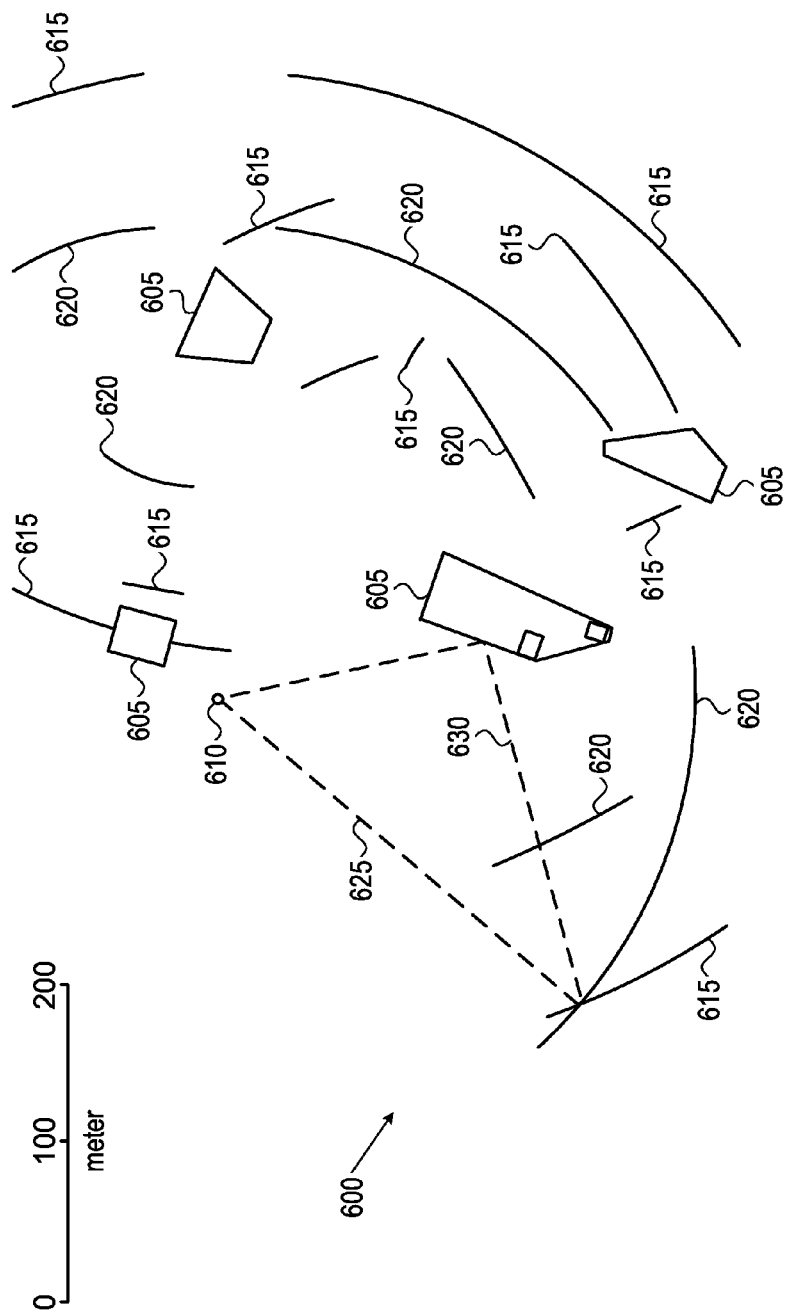
FIG. 6 depicts an exemplary diagram according to embodiments of the present invention.

An embodiment of the invention where a multi-reading sensor may be used 600 may be shown by reference to FIG. 6. A capability to locate a mobile station using a single site may be provided. With reference to FIG. 6, a sensor 610 may be located near buildings 605. Equi-distant loci, e.g. 400 m 615 and 400 m 620 may be found. An intersection of these loci may be at a single point, which may be an intersection of a direct ray 625 and a reflected ray 630.

Figure 7:
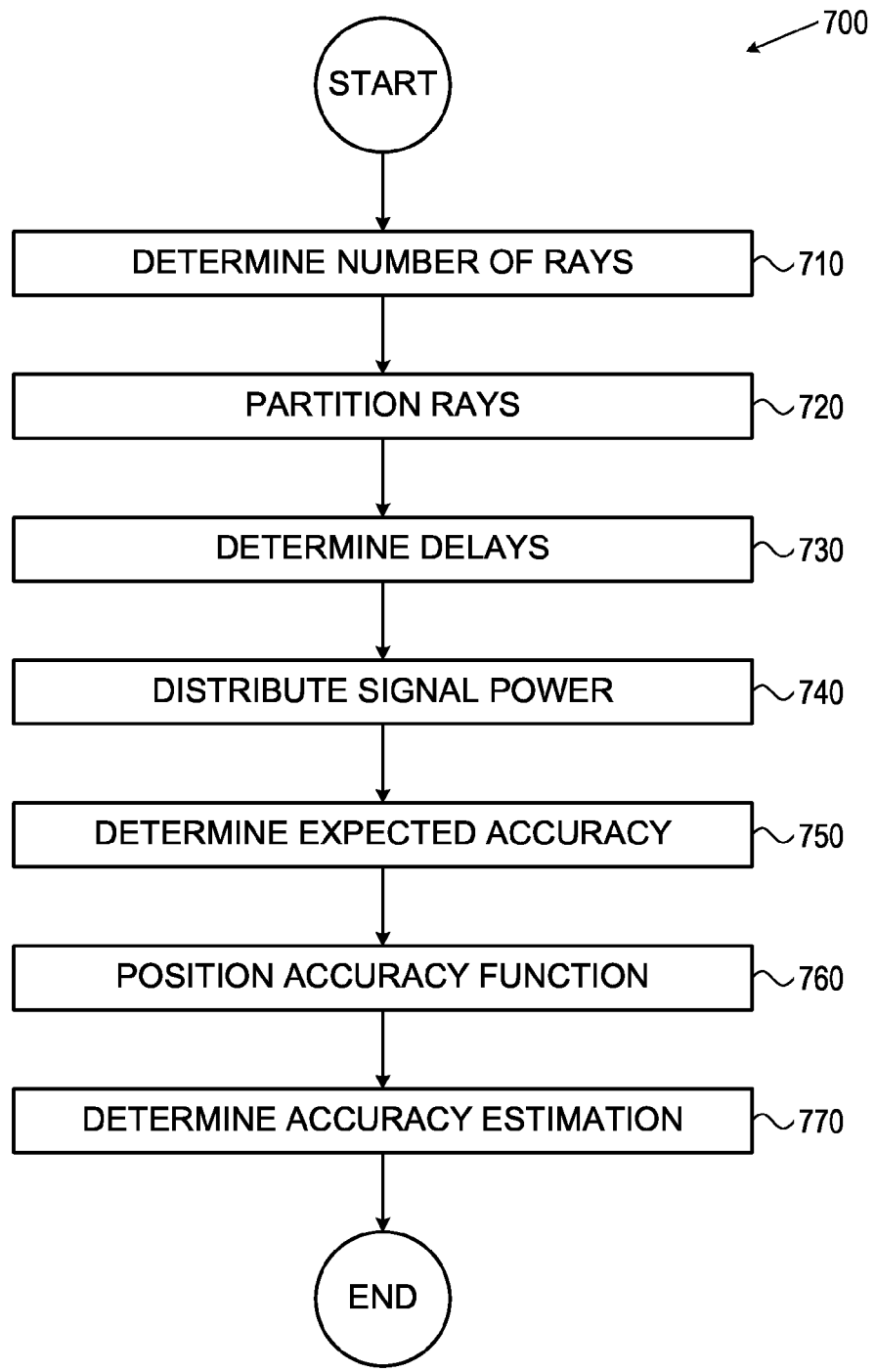
FIG. 7 depicts a method according to embodiments of the present invention.

An embodiment of the invention may be a method for estimation of accuracy of a location determination. An accuracy of a location process may depend on a range measurement accuracy as described above, but also may depend on a geometrical configuration of an intersection point. This may be referred to as a "geometric depletion of precision" (GDOP). A main difference may be a determination of range accuracy. A procedure 700 for location accuracy estimation is described below, and by reference to FIG. 7. A candidate intersection point may be determined, and for each, a determination of a number of rays that may arrive at a particular point from each sensor may be made 710. Each ray may be partitioned into clusters 720, and may be according to a signal and/or a sensor resolution. In each cluster rays that may arrive from a similar direction, for example as may be observed from an angle of arrival that may be calculated by a ray tracing algorithm, may be grouped together. For each cluster a determination may be made of an average delay 730, and a delay spread of a cluster, for example according to:

$$\tau_{rms}^2 = \sum_{l}^{L-1} P_l \tau_l^2 - \tau_{avg}^2$$

Statistics of an expected signal amplitude may be determined as well. Thus, if an arriving ray may be stronger than another, it may be a Ricean Distribution. Otherwise it may be another distribution, e.g. a Rayleigh distribution. Received signal power, as may be measured by a sensor, may be distributed to clusters 740, and may be according to each cluster's relative power. An expected range measurement accuracy may be determined 750 according to:

$$\bar{\sigma}_d = \int_0^\infty \tau_{eq} \exp\left(-\frac{r^2 + |a_0|^2}{2}\right) I_0(r|a_0|) dr$$

by: $\sigma_r = c\bar{\sigma}_d$. An accuracy function, e.g. an ellipse, may be positioned 760 according to a cluster ray direction. A ray direction may be described by a vector $i_r$, and an azimuth and elevation directions may be represented by vectors $i_\theta$ and $i_\phi$ respectively, a variance matrix may be represented by:

$$\sum = U \Lambda U^\tau$$

where $$\Lambda = \begin{bmatrix} \sigma_r^2 & 0 & 0 \\ 0 & \sigma_\theta^2 & 0 \\ 0 & 0 & \sigma_\phi^2 \end{bmatrix}$$

may be a variance matrix in $i_r$, $i_\theta$, $i_\phi$ coordinate systems and U may be a transformation matrix between such a system and a common coordinate system. An error along an angular axis may be determined, by default, by an antenna beamwidth, and/or by an antenna array measurement accuracy, if such an array may exist. In a common coordinate system a probability density function of a location that may be given by a measurement $\hat{r}$ may be given by:

$$f_r(r) = \frac{1}{(2\pi)^{3/2} \det(\sum)} \exp\left[-\frac{1}{2}(r-\hat{r})^\tau \sum\nolimits^{-1}(r-\hat{r})\right]$$

A combined probability density function of a set of N intersections may be given by:

$$f_N(r) = \prod_{i=1}^{N} \frac{1}{(2\pi)^{3/2} \det(\sum_i)} \exp\left[-\frac{1}{2}(r-\hat{r}_i)^\tau \sum\nolimits_i^{-1}(r-\hat{r}_i)\right]$$

where $\hat{r}_i$ may be an estimation that may be given by sensor i, and $\Sigma_i$ may be an estimation variance matrix that may be computed according to:

$$\Sigma = UAU^\tau$$

This probability density function may be used to determine an accuracy estimation 770.

In some embodiments of the invention, synchronization may be performed. A delay measurement mechanism may require synchronization among sensors. When a TOA technique may be used, synchronization between a sensor system and a mobile terminal clock may also be required. A root mean square deviation between sensor clocks, or, for example, a sensor and a mobile terminal clock, may be given by $\tau_{sync}$. An equivalent error:

$$\tau_{eq} = \sqrt{\tau_s^2 + \tau_{rms}^2}$$

now becomes:

$$\tau_{eq} = \sqrt{\tau_s^2 + \tau_{rms}^2 + \tau_{sync}^2}$$

Using this function, a delay error calculation as above may now be calculated using an equivalent delay error. Synchronization may be achieved by a plurality of methods. For example, a Global Positioning System (GPS) device may be used as a part of a sensor network to synchronize sensors. Or, if sensors may be connected to a network, e.g. a cellular network, synchronization source, a synchronization may be achieved by a cellular network synchronization. Another example may be use of a separate synchronization system, e.g. as outlined by a standard such as an IEEE 1588 standard.

Figure 8:
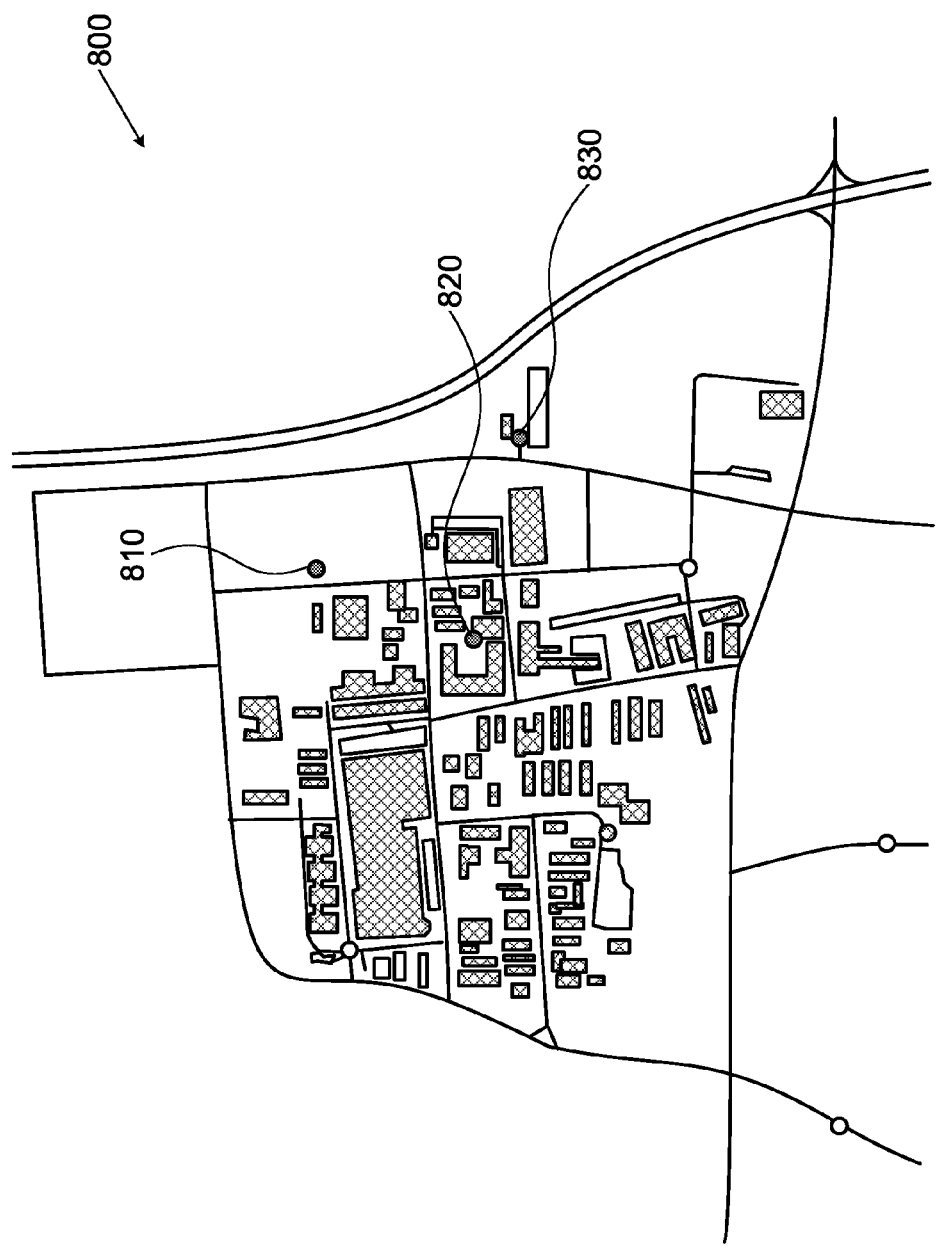
FIG. 8 depicts an exemplary diagram according to embodiments of the present invention.

An exemplary embodiment of the invention was tested by simulation, and may be shown by reference to FIG. 8. FIG. 8 may be a reference map 800 of an area over which a simulation was performed. A description of this area may be an industrial/urban area, with buildings of up to ten floors as well as low workshops, garages etc. A simulation includes three omni-directional sensors, of which sites are denoted by 810, 820 and 830 in the figure. An exemplary simulation uses a grid of 1700 m by 1300 m points, spaced 50 m apart, where such grid may be at ground level. Ray tracing may be used, and a list of rays, including a path length and a power for ray may be computed from each point to each sensor, in a plurality of combinations. Range measurements taken may be a shortest path that may be reported by a ray tracing result, and a signal strength measurement may be taken as a received signal strength of a corresponding path, e.g. a single reading sensor simulation. A measurement process may be simulated by adding to a reported range a random error, for example a normally distributed error that may have a varying standard deviation, and by adding a random error, that may be normally distributed, e.g. in dB, to a received signal strength measurement. Measurements may be used to determine a location estimate. The following table may show a median location error, (in meters) as a function of a range error standard deviation and a prediction error standard deviation, for a case where two sensors may have been used.

|  |  | Prediction std (dB) | | | | |
| --- | --- | --- | --- | --- | --- | --- |
|  |  | 15 | 12.5 | 10 | 7.5 | 5 |
| RANGE | 48.0 | 140 | 132 | 127 | 124 | 123 |
| std (m) | 24 | 92 | 86 | 81 | 78 | 77 |
|  | 16 | 78 | 73 | 69 | 67 | 65 |
|  | 12 | 73 | 69 | 65 | 62 | 60 |
|  | 9.6 | 70 | 66 | 62 | 59 | 57 |

The following table may show a median error for a case of three sensors. A median was taken over 10000 cases.

|  | | Prediction std (dB) | | | | |
| --- | --- | --- | --- | --- | --- | --- |
|  |  | 15 | 12.5 | 10 | 7.5 | 5 |
| RANGE | 48.0 | 92 | 90 | 87 | 86 | 86 |
| std (m) | 24 | 61 | 59 | 57 | 56 | 55 |
|  | 16 | 53 | 51 | 48 | 47 | 46 |
|  | 12 | 49 | 47 | 45 | 43 | 42 |
|  | 9.6 | 48 | 45 | 43 | 41 | 40 |

The first entry in each table, e.g. 140 m for two sensors in the first table, and 92 m for three sensors in the second table, may be results expected by other techniques. By using a geographical database, both a range accuracy and a prediction accuracy are expected to improve, and may result in a reduced error.

In some embodiments there may be steps that may be performed prior to real-time operation that may include creation of a database, as described above. A schematic depiction of a database 900 may be represented by reference to FIG. 9. Data may be collected that may be relevant to a geographic area where location measurements and determinations, as described above, may be made. Data may be collected in three dimensions, e.g. for specific spatial location. Data items may be specific geographic information 910 that may include terrain features, e.g. topological features, dimensions and relative and absolute positions. Other specific data may be included, e.g. terrain height and land use information. Such geographic data may be available from mapped information or may be gathered specifically for a measurement application herein. Data items may be specific information about artificial structures 920 and may include location information that may be obtained from maps, e.g. survey maps. Artificial structural information may include specific characteristics of a structure, e.g. building height, footprint dimensions, number of floors, etc. Other specific data may be included, e.g. building contours. Structural information may include information about materials and RF properties of materials, e.g. absorption, refraction, reflection, diffraction or scattering coefficients, as described above. Elements of information may be specific to a structure, for example a building with multiple floors may have information that may be specific to each floor, and may form a part of a three dimensional database. Measurements may be made within a structure, e.g. indoor range measurements, or outside a structure, e.g. outdoor range measurements. For both geographic information 910 and artificial structure information 920 a database may include a list of rays from each LMU and each base station. Ray information may be gathered prior to operation of an embodiment of the invention, and may be stored for use during operation. Signals may be transmitted from one or more base stations and return signals may be correlated with cartographic information and/or structural information, where such correlated information may form a part of a database. Signals may be received by sensors that may be single-reading sensors, and range information and delay spread information may be stored together and may be compressed for storage, where such compression may depend on a method of database storage and/or access. Signals may be received by sensors that may be multi-reading sensors, and range information and delay spread information may be stored together and may be compressed for storage, where such compression may depend on a method of database storage and/or access, or such compression may depend on a resolution of a signal that may result from a number of measurements that may be provided by sensors. Range vectors and/or signal strength vectors may be determined and stored in a database.

Network configuration information 930 may be any available information about a network that may be communicating with wireless devices. Network information 930 may include network features, for example configuration information, and may include details of network component connectivity, both hardware connectivity and software connectivity. A location of each base station and each LMU may be included in network configuration 930, and a location may be a physical location or a virtual location that may be based on connectivity. Other network configuration information may also be included. Information about each antenna 940 that may be used to receive signals from wireless transmitters may be available, and may include a height, type and/or an orientation of each antenna. Other antenna information may be included.

Geographical information 910, building data 920, network configuration information 930 and antenna information 940 may be used by an RF prediction calculator 950 to create a database of information that may apply to an area that may be covered by a system for communicating with wireless devices, e.g. a cellular system, where locations of such devices may be desired to be known. An entire system area may be covered. An RF prediction calculator 950 may use any known technique to categorize and organize information that may be collected. An RF prediction calculator may operate prior to operation of a location finding method, or may operate during a location determining operation. Data may be collected prior to, or during, a searching function. A database may be an RF prediction database 960, and may include information about signals that may be received by wireless devices, for example rays from each LMU and each base station. Rays may be stored in a list, or any other format. During a determination of a location of a wireless device, a query may be received and a location engine may search an RF prediction database 960 for a matching set of information, e.g. a best fit range vector and/or a signal strength vector, for a received set of measurements. A location calculation engine may operate as described above. Other searches for other matching information may be performed.

A prediction of radio or wireless signal strength may be based on measurements of such strength that may be gathered at one or more measurement points. A radio wave propagation model may be used to aide in prediction of signal strengths. Actual measurements may be used to enhance a model, and may result in an improved model that may more closely depict actual environmental conditions. Such an enhanced model may be used for signal strength predictions in areas where actual signal strength measurements may be lacking, or otherwise unavailable. A method for developing such an enhanced model may be used, and may be described herein, and may be referred to as a model calibration method, or calibration method. A model of an environment may be constructed, where such model may be physically based, mathematically based, or based on other modeling principles. Obstacles and/or other physical parameters may be identified and may form parts of a model. A model may be used as a propagation model for radio wave propagation in order to predict signal strengths of such radio waves at various points within a region that may be described by a model. Signal strengths may be found at points where signal strength measurements may have been made, or at other points where signal strengths may be predicted by a model. Physical parameters, e.g. building locations, building heights, and other physical parameters, may be estimated, where such estimates may form a part of a model, and may be based on a set of measurements that may be made, e.g. field measurements. Field measurements may be made by a wireless system operator, or other entity that may have sufficient field measurement capability, e.g. a cellular network operator. Estimates of physical parameters may be adjusted based on field measurements, where such adjustments may be in accordance with a calibration method, and may result in a more accurate model of signal strengths and signal propagations across a region of interest.

Figure 10:
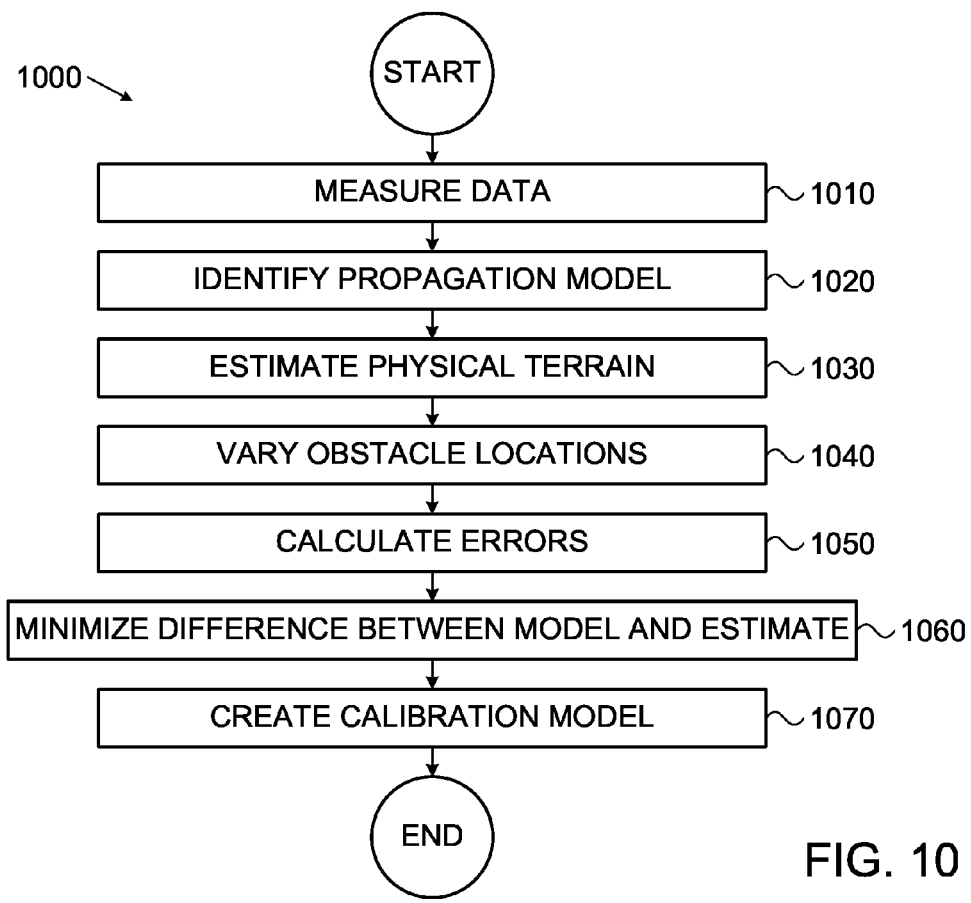
FIG. 10 depicts a method according to embodiments of the present invention.

A method 1000 for forming an accurate model, or calibrating a model, may be described by FIG. 10. Data may be measured 1010 in an actual environment, where such measurements may be made by various means, e.g. drive tests. Measured data may include signal strength measurements, and may be correlated to geographic location information of a measurement point. Signal strength measurements may be relative to a particular transmitter, e.g., a base station, or to a radio wave environment. A propagation model may be identified 1020 as an initial model that may be indicative of a measurement situation in an environment, and may be chosen as a model to be calibrated. Locations of physical terrain, e.g. buildings, hills, or other obstacles, may be estimated using an identified model as a basis, with a contribution of measured data. Obstacle locations may be varied 1040 within a model to best match a model to data measured from an actual environment, and errors between a modified model and measured data may be calculated 1050. Varying of obstacle locations within a model may continue until differences between a modified model and an estimate of predicted signal strengths are minimized 1060. Using results of obstacle locations after minimizing any differences, a completed calibration model may be created 1070. Various methods may be used for reconstruction of maps of obstacles, for example an Analysis by Profile method, a Gradient Search method, a Genetic Algorithm method, a Building Replacement method, or a combination of such methods. Other methods that may produce similar results may also be used, either alone or in conjunction with other exemplary methods mentioned herein. Some exemplary models that may be used may be a single knife-edge model, a multiple knife-edge model, a single wedge model, a rounded obstacle model, a diffraction model, e.g. diffraction around buildings, a vegetation inclusive model, a ray tracing model, a model calibrated by a mathematical process, e.g. regression, a combination of such models, or a combination of such models with other models.

An exemplary environment may be mobile wireless communication, which may use radio waves of a defined wavelength, e.g. 5-20 cm in length. Radio waves may propagate in an urban or a suburban environment, and may be affected by factors, for example reflection, diffraction and/or scattering, and may be from objects, e.g. buildings, vegetation, vehicles, power lines, or other objects. An accurate radio strength prediction may rely upon a location of each object that may be known to within a certain accuracy, e.g. centimeter, as well as a type of material each object may be made of. Such information may not be available at a level of accuracy that may be desired. In order to overcome such difficulties, a plurality of models may be developed for use by radio planners. Such models may predict a signal strength based on available information and/or a set of assumptions about an environment. An exemplary model may be a dual slope model, which may take into account primarily ground reflections, and thus may give a prediction of a signal strength as a function of a distance between a transmitter and a receiver, a radio frequency, and/or antenna heights. Such a model may be applied in many cases where line-of-sight may exist between a receiver and a transmitter. Another exemplary model may be a HATA-Okumura model (Hata), which may be based upon measurements that may have been taken in a multitude of locations, e.g. cities, and in various conditions. Similar in fashion to another exemplary model, a dual slope model, this Hata model may give a prediction of signal strength as a function of a distance between a transmitter and a receiver, a radio frequency, and/or antenna heights. Such a Hata model may give a result which may be typical to non-line-of sight propagation, and may be an average of measurements made in similar conditions in various locations, e.g. cities. Other exemplary models may be Bertoni, Walfisch-Ikegami, and Blaunstein's parametric models. Each of such models may be used for urban propagation, or similar environments, and may take into account such parameters as a gap between buildings, an angle of diffraction, a building density, or other related parameters. Any of these exemplary models may be used as a base model for model calibration.

Exemplary models described herein that may be used as a base model for a calibration method may not fully account for an actual environment, e.g. terrain height profiles and/or building locations. When such information may exist, predictions for a given point may be made more accurate, and such models as, for example, a knife-edge model, or ray-tracing, may be used. Such models may be physical models that may use known propagation mechanisms and/or wave interaction to predict received signal strengths. However, accuracy within such models, alone, may have limitations, and may be based on precise knowledge of physical object features. More accurate predictions may be achieved by using measurements check and to "calibrate" a model. For example, in cellular systems such measurements may be conducted on a regular basis, wherein specially made equipment may be used to collect a large set of strength measurements at a plurality of points, where each point may be a location where a signal that may be transmitted from one or more base stations may be received. Measurement instruments may also produce a measurement location as well as signal strength measurements, and such locations may be correlated to such measurements. Measurement locations that may be correlated to such measurements may be stored locally or remotely, and may be used to construct a database of measurements and associated location information. A calibration process may involve modifying model parameters in order to approximate, as much as possible measurement data. Various techniques may be used, for example, linear regression on each of the model parameters. Another exemplary technique may be Newton's method, in order to find optimal solutions, where such optimal solutions may be a minimum of a mean squared error between a model prediction and an actual measurement. With such a model, correlated and constrained parameters may also be calculated, and may provide an improvement over classical linear regression. Each of such exemplary methods may assume a certain model, which may not be directly related to a physical environment. Obstacles may cause a reduction of signal strength at a certain point, which may be attributed by a calibration process to another parameter, e.g. range, and may cause a less accurate estimation of signal strength for other points at the same range, which may not be obstructed. As such, a calibration method may account for such situations.

Prediction of signal strength may be prone to errors, and may be mainly due to lack of information about a propagation environment. Network operators, e.g. cellular network operators, may regularly conduct signal measurement campaigns, e.g. drive tests or walk tests. During such campaigns dedicated instruments may be used which may provide measurement point coordinates as well as strengths of signals that may be received at a measurement point arriving from, for example, a number of base stations. Such instruments may provide coordinates using a variety of means, e.g. Global Positioning System (GPS), or other navigational means. Drive test results may be used as an indication of signal strengths at measurement points. For points other than measured ones, a propagation model may be used. A model may be calibrated, and its parameters may be modified so that it may better fit to measurement points. A calibration process may enable use of a model for other points, when they may be at a location, e.g. a neighborhood, where a test, e.g. a drive test, may be made, and that they may be within a similar propagation environment. It will be recognized that the drive tests described herein are merely exemplary. According to embodiments of the invention, measurements of the signal strength, from which the path loss is derived, may be made using signals in the downlink direction, the uplink direction, or both the downlink and uplink directions. For example, the signal strength measurements may be collected at the base station, in which case, the transmitter is a mobile device for which the location is known, e.g., by GPS, while the receiver at the base station measures the signal strength. In another embodiment of the invention, measurements may be made both by a mobile device based on signals transmitted by the base station, and by a base station based on signals transmitted by the mobile device.

Calibration procedures may fit model parameters, e.g. mathematically, to measurements. An embodiment of the invention may use measurements, e.g. drive test measurements, to reconstruct a land use map, and may be used to estimate obstacle locations and/or heights, which may used for radio signal strength prediction by a physical model. An embodiment may be used to locate buildings, trees and/or other obstacles, which may or may not be charted, for example on a map. A need to purchase high-cost high-resolution and detailed maps for a purpose of radio planning may be avoided. Reconstructed obstacle maps may be used for prediction of signal strengths at other radio frequencies and/or at different antenna heights, as a physical propagation model may take those parameters into account. Thus, for example, once the obstacles are known, path loss may be recalculated, using equations such as Eqn(1) and/or Eqn(2) below, for any desired frequency. Accordingly, measurements in one frequency may be used to find the obstacle locations and, with this information, the appropriate calculations may be performed in another frequency. Similarly, this principle may be applied to different heights of the antennas, or the use of another model. That is, the obstacles may be discovered using one antenna height, and used for an antenna having a different height; the obstacles may be discovered using one model, and used in connection with a different model. Such techniques may be integrated with other information, e.g. information at other neighborhoods, and may extend a validity of a drive test.

Embodiments of the present invention may use data that may be collected from an environment to reconstruct building and/or object information, where this reconstruction may be performed in a virtual manner. Reconstruction maybe performed by a processor, and may be performed within a computing device. Such reconstruction information may be stored in a memory.

An embodiment of the invention may use a method that may be referred to as a Profile Method. A method may assume a single knife-edge propagation model between two points. In such model, it may be assumed there may be a single obstacle between a transmitter and receiver. An obstacle may be located at a distance of $d_1$ from a transmitter and $d_2$ from a receiver. An obstacle may obstruct a line connecting a receiver and a transmitter, e.g. a line-of-sight, that may protrude by distance h above it. It may be noted that h may be a negative value, and may indicate that an obstacle may be close but may not be obstructing a line of sight. A path loss between a transmitter and a receiver may be given approximately by $$L_{path} = 20\log_{10}\left(\frac{4\pi d}{\lambda}\right) + 6.9 + 20\log_{10}\left(\sqrt{(v-0.1)^2+1} + v - 0.1\right) \text{ [dB]} \quad (1)$$

where:
$d=d_1+d_2$ may be a distance between a receiver and a transmitter, and $$v = h\sqrt{\frac{2}{\lambda}\left(\frac{1}{d_1}+\frac{1}{d_2}\right)} \quad (2)$$

may be a parameter describing a clearance, e.g. a Fresnel zone clearance, of a path. $\lambda$ may be a wavelength of electromagnetic waves. A path loss may be found, for example by measurements, and a path loss for a certain link may be found. Using path loss information a height of an obstacle that may cause a path loss may be calculated as a function of a distance from a transmitter, e.g. a base station. A plurality of points in an area may be identified and each corresponding communication link, e.g. lines connecting a base station to measurement points, may be constructed. For each link, a height of an obstacle that may produce a received signal strength may be calculated, when such obstacle may be located at such point. A minimum, or in some cases a median, value among a plurality of links may be chosen as a height of an obstacle at such point.

A Profile method process may be repeated using multiple-knife edge propagation models, and may take into account heights of obstacles that may already have an estimate, and may determine an updated height at each point. There may be several multiple knife-edge models which may be applied. For example, a Deygout method, or similar method, may be used. In such method, a total path loss may be given by $$L_{path} = 20\log_{10}\left(\frac{4\pi d}{\lambda}\right) + 13.8 + 20\log_{10}\left(\sqrt{(v_1-0.1)^2+1} + v_1 - 0.1\right) + \\ 20\log_{10}\left(\sqrt{(v_2-0.1)^2+1} + v_2 - 0.1\right)$$

$v_1$ may be a the Fresnel clearance, and may be calculated between a transmitter and a second obstacle, and $v_2$ may be a clearance calculated between a first obstacle and a receiver. Such method may be used, and a height of an obstacle along a link path may be calculated. An assumption may be made where all other obstacle parameters, e.g. height, along the link may be correct. A second obstacle in such expression may be a most obstructing among such group of obstacles. Such a process may converge after a number of iterations. Such method may rely on lines that may connect base stations to measurement points, and may rely upon certain geometries. Such method may not require a search, and may thus have an advantage.

An embodiment of the invention may use a method that may be referred to as a Gradient search. A method may assume that for a certain area a building density, e.g. a number of buildings, may be determined, and such information may be useful. In such method, a model may be created where a given number of buildings may be spread randomly over an area, predictions of parameters, e.g. height predictions, that may be based on one or more predetermined factors, e.g. database or mapping information, may be determined. A quality of predictions compared to measurements at any point may be calculated. Such quality may be a function of an error between a signal strength prediction and an actual measurement. A mean squared error, or a root mean square of an error, for example, may be typical functions that may be used for such a purpose. A location of each building may be changed slightly, and a location that may improve an overall quality may be chosen as a new location of a building. Repetition of such process for each building may improve an overall quality between each step, and may continue until no further improvement may be observed, or a desired minimum improvement may be reached. For a prediction, any physical model may be used, e.g., single knife-edge, multiple knife-edge etc., and such model may also include an effect of diffraction around buildings. A mean-square error may be used as a measure of quality of a prediction, although other criteria may also be used. Extensive computation may be utilized by such method and local minimum solutions of a quality criterion may be avoided.

An embodiment of the invention may use a method that may be referred to as a Genetic Algorithm Optimization. A method may assume that a number of buildings in an area may be known. Each set of random locations may be treated as a "gene", and a population of such genes may be produced. A best solution may be searched for and found using genetic algorithm techniques, and such method may be an alternative to other algorithms, e.g. step by step optimization techniques. Such method may be very efficient in searching over a large space of solutions. Determination of local minima may require additional computation. A genetic algorithm may be used when a search may be required over a large number of locations. A genetic algorithm may be a best fit method of calibration. It may begin with a random, or seeded random, obstacle locations and/or heights, and each may be represented mathematically, e.g. by vectors or matrixes. A set of parameters, e.g. a location in three dimensional space, may be associated with each obstacle. A set of vectors and/or matrixes may be "mutated" or varied where one or more parameters may be changed, or pairs, or other combinations of parameters may be changed together. Calculations may be made that may compare a mutated model to measured data and/or estimates of signal strengths, as described herein. Such a mutation process may continue until a model is fit to measurement data to within an allowed difference, for example by minimizing a difference between a model and estimates. A convergence time may depend on starting model parameters.

An embodiment of the invention may use a method that may be referred to as a Building Replacement method. A method may begin by creating a model where an area may be portioned into small squares, and placement of buildings may be made into some squares. Each square that may be vacant of a building may be considered. A determination may be made of a possibility of moving a building into such vacant square from each of other squares that do contain a building. Accuracy of such model may require additional consideration.

Some embodiments of the invention may use a combination of methods presented above, as a Combined method. Such a method may use a plurality of the above described methods, and such combinatory method may be more useful for various scenarios, geometries and availability of drive test data, or other data. For example, a knife-edge assumption may serve as an initialization step and an upper bound to building heights. Then, a solution may be improved using, for example, a genetic algorithm, a building replacement method and a local gradient search.

Embodiments of the invention may use additional information that may be available, for example that may be found from maps, e.g. road maps, or from other land use data. Such additional information may be a lower cost to acquire, and may be more readily available. Obstacle placement may be constrained along road sides or may be limited to areas of which a use may be adequate. Such placement may allow a search space to be limited and performance of a method described herein may be improved.

Figure 11:
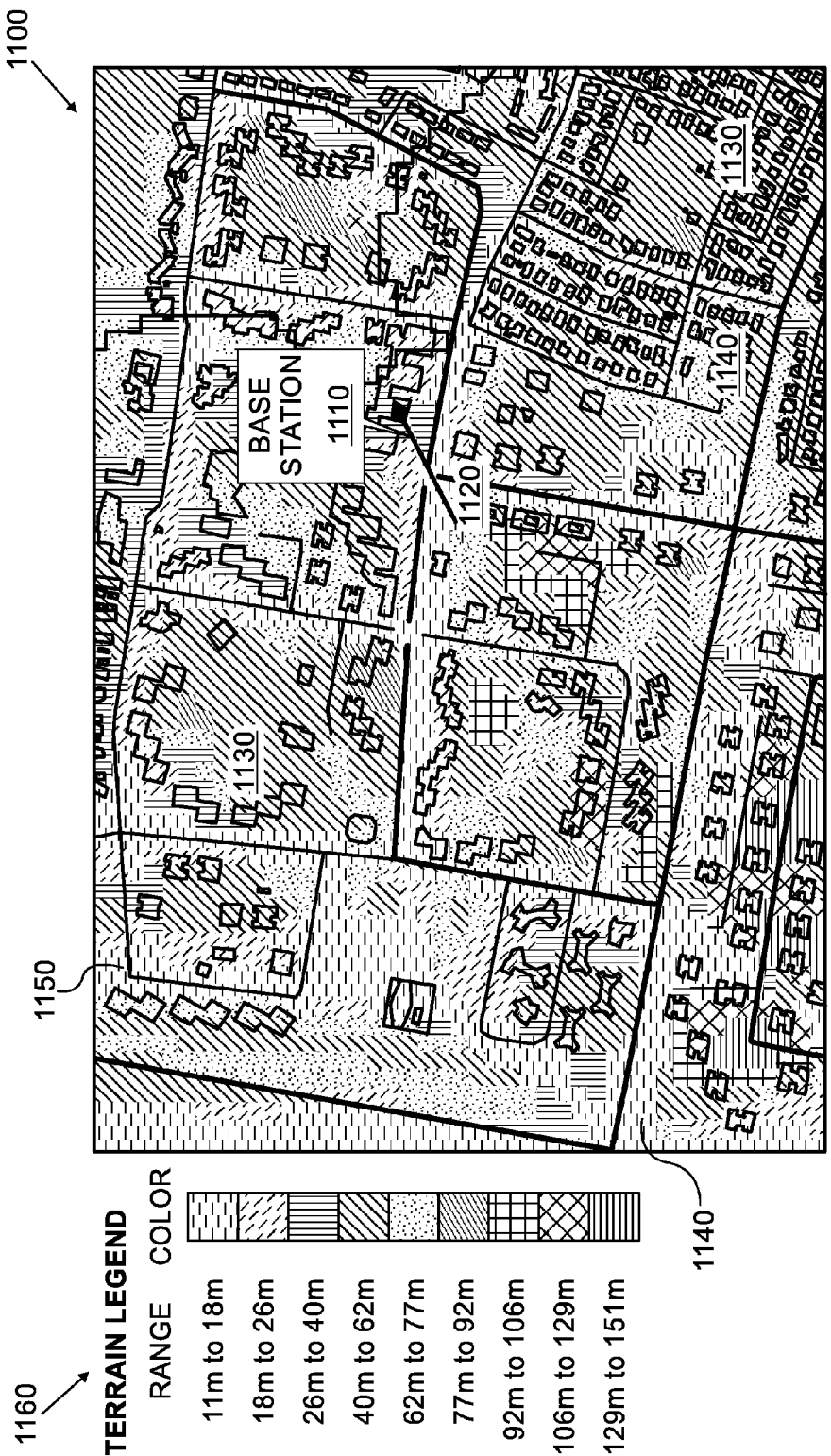
FIG. 11 depicts an exemplary diagram according to embodiments of the present invention.

FIG. 11 may describe results of an algorithm, that may use a knife-edge assumption method. An exemplary urban area may be shown 1100, which may include buildings 1130, and roads 1140. Contrasts may represent heights of elements, e.g. ground, buildings, or other obstacles, as may be calculated by an algorithm described herein. Low elevations may be darker, and additional progressively lighter contrasts may represent heights of obstacles in an increasing order, and may be detailed in an attached legend 1160. A base station 1110 may include an antenna, e.g. a single sector antenna, and may be located on top of a building. An antenna may be directed in a particular direction, e.g. south west, as shown by directional line 1120. A street level 1150 may be detected quite well, and may be determined by a distinguishing contrast between a street level 1150 and surrounding areas. Buildings may also be detected. An accuracy of detection of a street level 1150 may be better, in some embodiments, than an accuracy of detection of buildings 1130.

Figure 12:
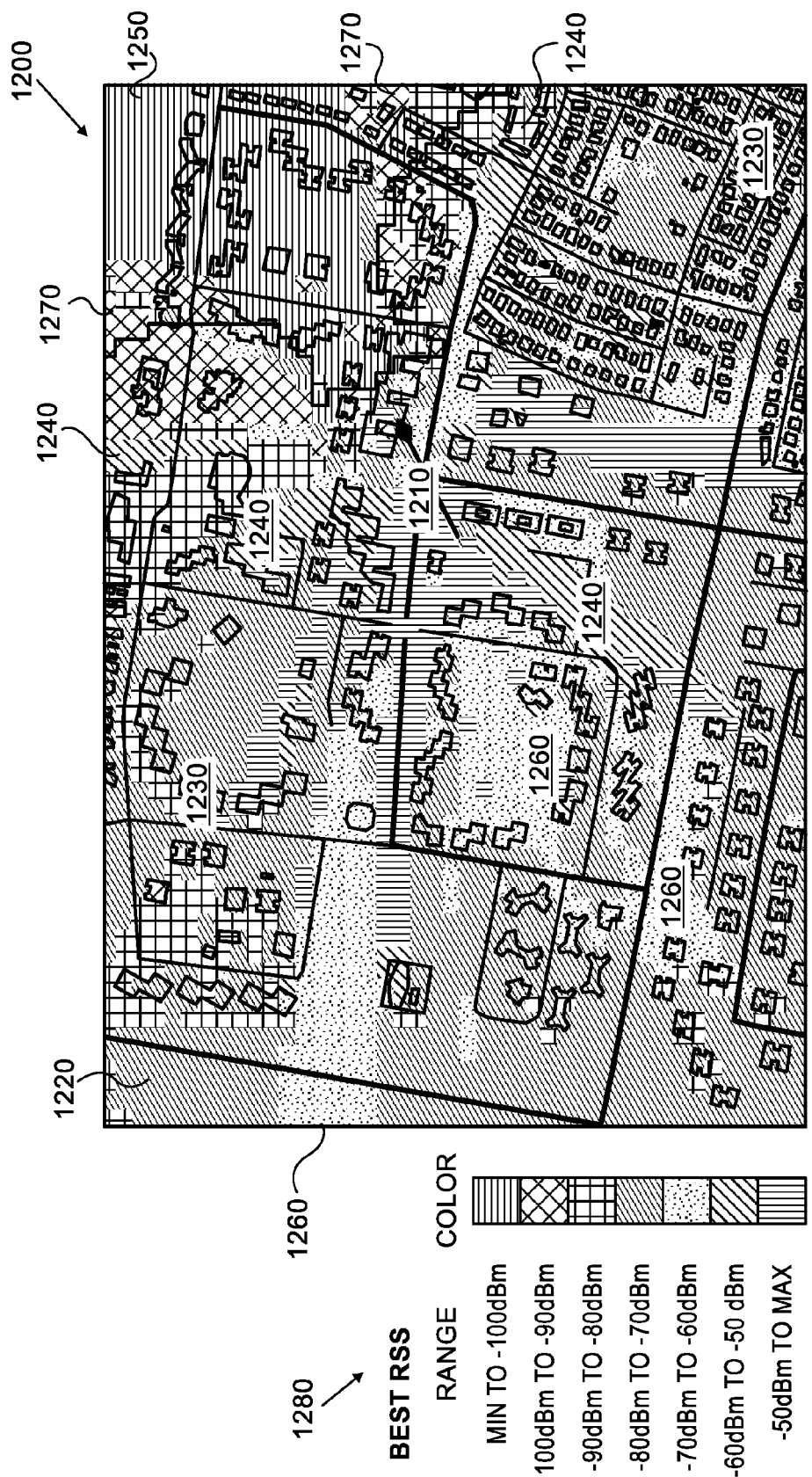
FIG. 12 depicts an exemplary diagram according to embodiments of the present invention.

FIG. 12 may describe results of an algorithm, that may include use of a database, e.g. a high accuracy database, that may include location information for each building. An exemplary urban area may be shown 1200, which may include buildings 1230, streets 1220, and/or other features. A high accuracy database may be used to calculate a received signal strength, and may be depicted on such exemplary urban area 1200. Signal strength is shown in contrast, where areas receiving a high level signal 1240 are shown, areas with an amount of lower signal strength 1260 are shown, areas of lower signal strength are shown 1270, and areas of lowest signal strength 1250 are also shown. Thus distinguishing levels of signal strength may be depicted. A directional antenna may be used for measurements in such an exemplary environment, and may be pointed in a given direction 1210. An area of high signal strength 1240 may be found, for example, in a direction consistent with a direction 1210 of a directional antenna. An area of low signal strength 1250 may be found in a direction opposite a direction 1210 of a directional antenna. A received signal strength (RSS) may be grouped into ranges 1280.

Figure 13:
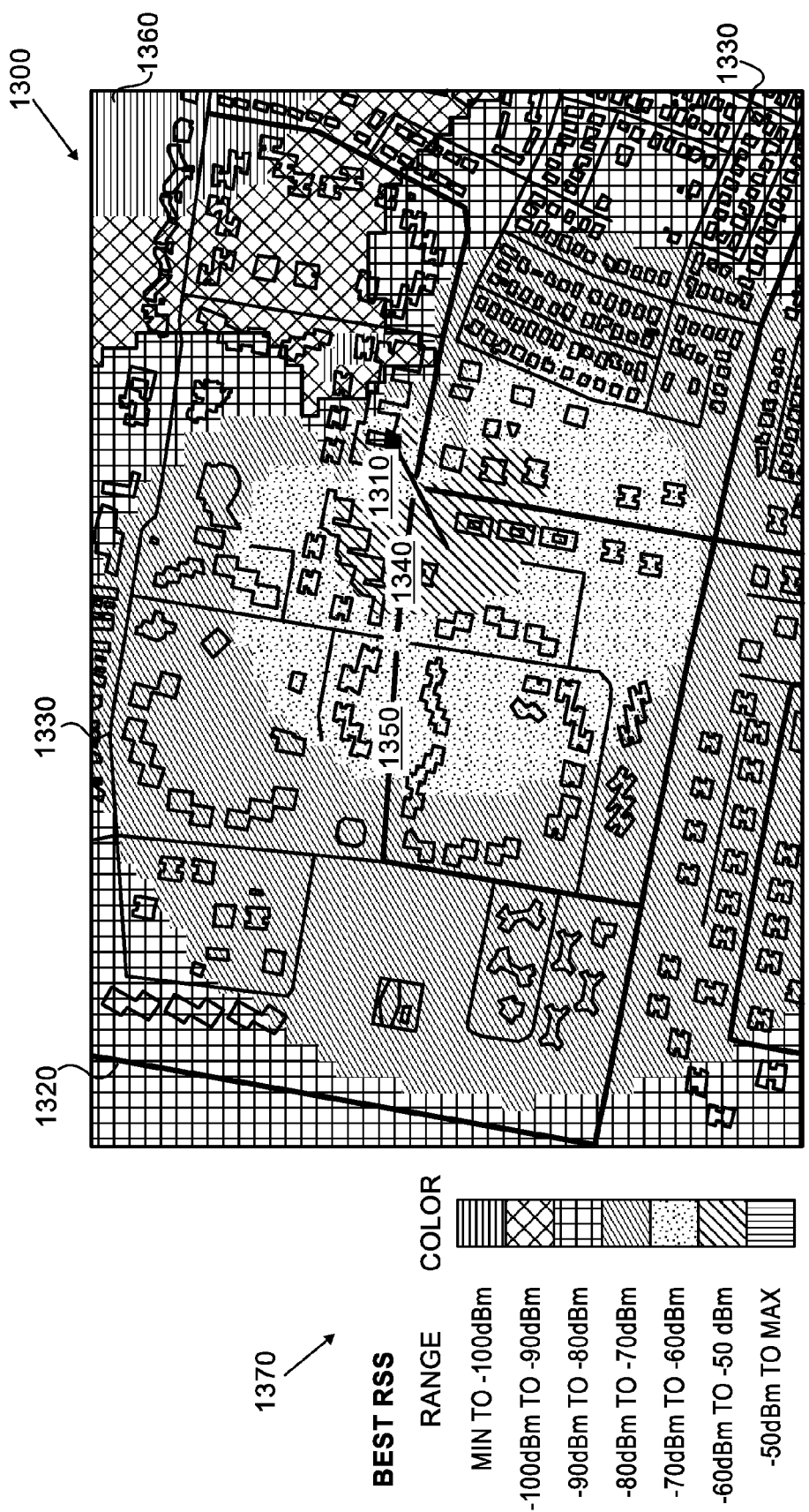
FIG. 13 depicts an exemplary diagram according to embodiments of the present invention.

An exemplary embodiment where a Hata model may be used is shown by FIG. 13. An exemplary urban area may be shown 1300, which may include buildings 1330, streets 1320, and/or other features, and which may exclude building information from a model. A HATA model may be calibrated and may be used for prediction. It may be seen that without additional information a signal strength may depend on a direction that may be relative to system parameters, e.g. a sector boresight and/or a range. An antenna, for example a directional antenna, may point in a direction 1310. A region of high signal strength 1340, a region of lower signal strength 1340, a region of lowest signal strength 1360, and other signal strength regions may be shown. An area of high signal strength 1340 may be found, for example, in a direction consistent with a direction 1310 of a directional antenna. An area of low signal strength 1360 may be found in a direction opposite a direction 1310 of a directional antenna. A received signal strength (RSS) may be grouped into ranges 1370.

Figure 14:
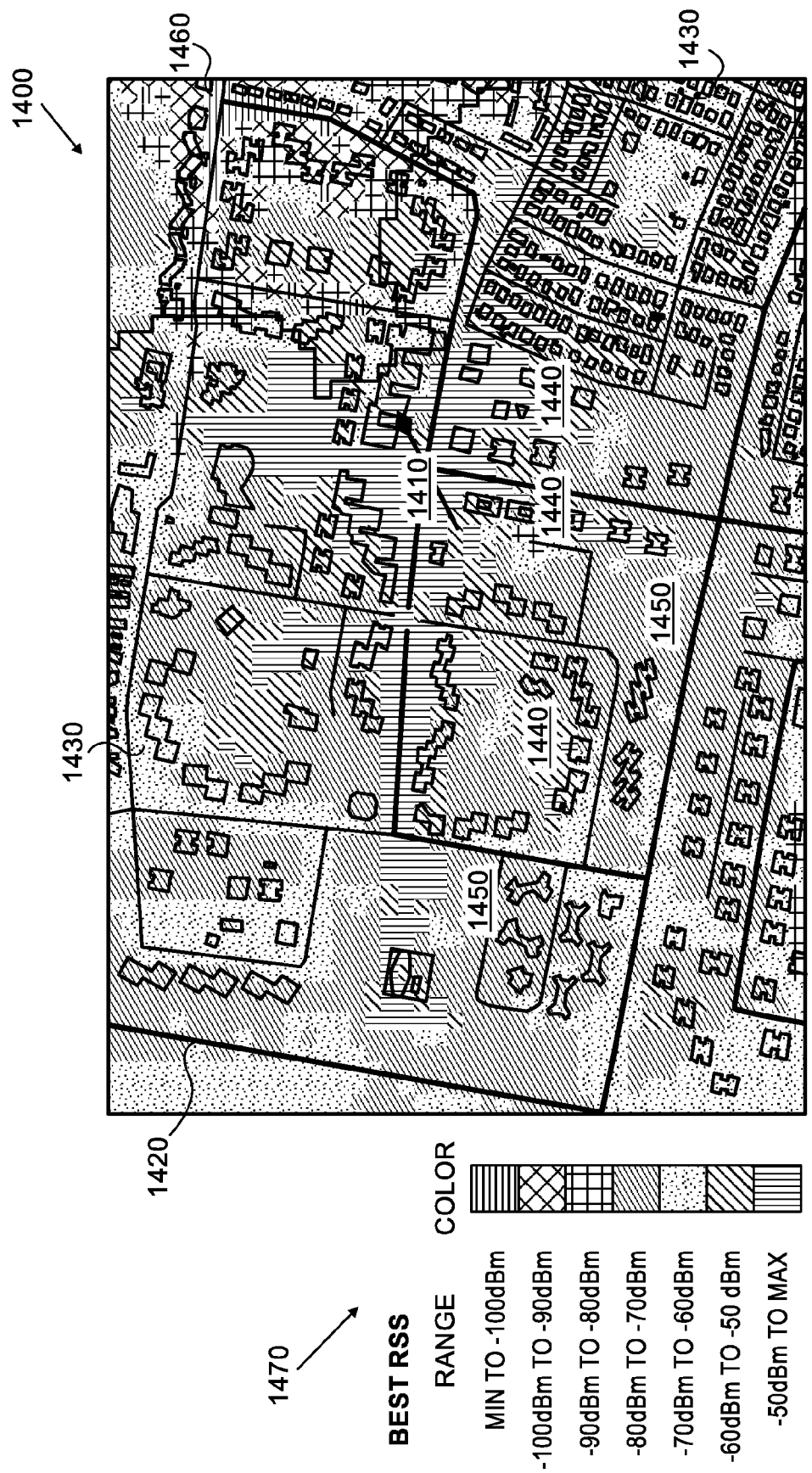
FIG. 14 depicts an exemplary diagram according to embodiments of the present invention.

An embodiment may perform a prediction, and may utilize estimated building heights as described above, and shown in an exemplary fashion by FIG. 11. A result of such a prediction may be shown by an exemplary urban area 1400 of FIG. 14, which may include buildings 1430, streets 1420, and/or other features. A region of high signal strength 1440, a region of lower signal strength 1450, a region of lowest signal strength 1460, and other signal strength regions may be shown. An area of high signal strength 1440 may be found, for example, in a direction consistent with a direction 1410 of a directional antenna. An area of low signal strength 1460 may be found in a direction opposite a direction 1410 of a directional antenna. A received signal strength (RSS) may be grouped into ranges 1470. By comparison, such a prediction may be much better than a prediction that may be based, for example, on a HATA model, alone, and may more easily identify a true signal strength along a street. It may produce quite accurate results in other parts of an area as well. A lack of data may result in an algorithm not entirely identifying an obstruction that may be caused by a building that may be behind a base station, but this may be identifiable. However, such a prediction may be obviously superior to a standard HATA model calibration technique.

Radar systems may use the Doppler measurements to estimate target velocity. However, typically such systems do not estimate target velocity in a multipath environment. Further, using geographical information in conjunction with such measurements may be unique. A geographical database may be combined with a physical propagation model, such as ray tracing. Velocity estimation may be performed rapidly, e.g. within less than a second. Embodiments of the present invention use propagation analysis methods, e.g. ray tracing, Doppler measurements and physical models, e.g. geographic databases, together to determine a velocity of a target, e.g. a mobile transmitter. Estimation of velocity by methods of embodiments of the present invention may be performed rapidly, and approach near-real time, or real-time target velocity estimation.

A desire may be to estimate a velocity of a mobile station in a cellular system, and an estimate may be based on geographical data. An accurate velocity estimation of mobile cellular terminals, e.g. mobile phones, may be determined without modifying operation of a cellular system, and without adding any special devices, e.g. global positioning system (GPS) capability, to a terminal.

An embodiment of the invention may make use of receivers, e.g. dedicated passive receivers, which may be inclusive of a functionality of a cellular system base station operating, for example, on a receive only mode. Such devices may be based on certain chipsets, e.g. femtocell chipsets, and may make them cost effective. Such devices may be connected to a base station's antennas and/or power amplifiers, and may produce a minimal effect on their performance. Devices may receive same signals that may be transmitted by mobile stations, decode them and may be capable of processing a received signal.

An embodiment may operate with advanced systems, e.g. a third generation UMTS or a fourth generation long term evolution (LTE), and may use wide bandwidth signals. Such systems may enable finer resolution range measurements to be performed. Such systems may also transmit known signals and/or sounding signals which may facilitate use for a purpose of channel estimation. Full measurement of a spectral channel response may be available, and delays, e.g. power and/or Doppler spread of impinging rays, may be readily estimated. Advanced systems, e.g. $3^{rd}$ generation and/or $4^{th}$ generation systems, may be equipped with an array of antennas, which may be used to provide information, e.g. a spatial signature, or a direction of impinging rays. Such information may also be utilized to improve terminal location and/or velocity estimation of a mobile terminal and/or device.

An embodiment may use signal processing, e.g. time-frequency signal processing, together with a geographical database, to provide an estimate of a terminal velocity, and such estimate may be in terms of a magnitude and/or a direction. A geographical database may be used for prediction of ray trajectory, e.g. using ray tracing, and predictions of ray power to provide an estimation of a propagation delay profile associated with each point. A moving terminal may induce a Doppler shift of a transmitted signal, which may be dependent upon a terminal's speed and/or direction. An absolute shift may not be available, but a Doppler spread pattern, together with information given by a predicted delay profile, may be used to estimate an actual speed and/or a direction of a mobile station with much accuracy. Additionally, if a receiver and/or a mobile device may be equipped with an antenna array, e.g. as may be expected in $4^{th}$ generation systems, angular information may be used to further enhance an accuracy of a location estimation with angle of arrival (AOA) data, which may be linked to Doppler information.

Velocity information may be used to further improve a location estimation, as such information may provide additional information which may be integrated, for example by using smoothing or filtering, e.g. by a Kalman Filter, Velocity information may be used with location measurements to refine location information and resolve ambiguities that may exist within raw measurements.

Figure 15:
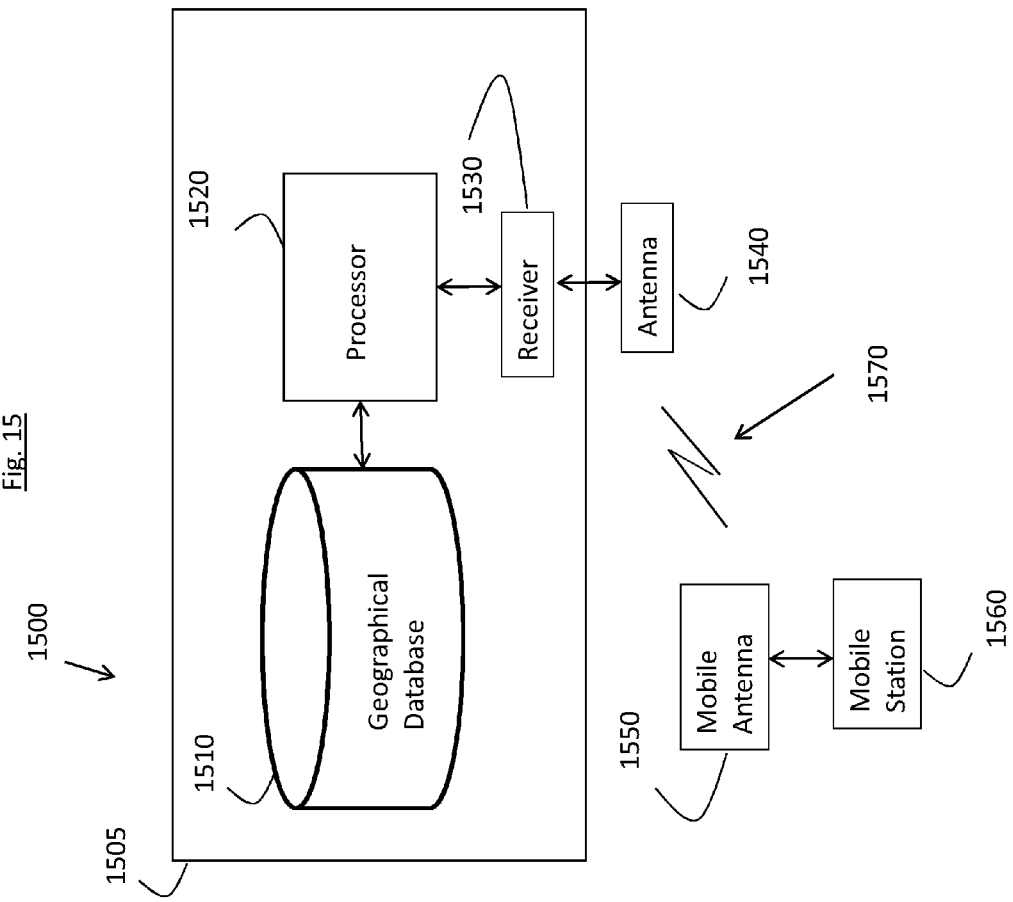
FIG. 15 depicts an exemplary block diagram illustrating a system according to embodiments of the present invention.

Reference is now made to FIG. 15, which is an exemplary depiction of a system, according to an embodiment of the invention. System 1500 may be comprised of one or more mobile stations and one or more fixed stations, and where, for example, one mobile station 1560 and one fixed station 1505 are shown in FIG. 15, for clarity. Processor 1520 may be located within a fixed station 1505 and may process signals received by receiver 1530. Processor 1520 may also perform processing operations on information contained, or stored, within geographical database 1510 and/or combinations of stored and received information. Processor 1520 may perform time-frequency signal processing, and may be able to calculate an estimate of a velocity of mobile station 1560, a location of mobile station 1560, or other like information.

Geographical database 1510 may contain information, e.g. descriptive information, about objects, e.g. buildings, terrain, etc., within a geographical area. Geographical database 1510 may be created prior to signal 1570 being transmitted, and may be contributed to at any time. Information contained within geographical database 1510 may be accessed by processor 1520, and processor 1520 may be locally or remotely located with respect to geographical database 1510. Geographical database 1510 may be remotely located and operably connected to processor 1520. Geographical database 1510 may be comprised of any suitable storage elements, e.g. random access memory (RAM), hard disk drives, network-based storage, etc.

Receiver 1530 may receive signals, or information, from antenna 1540. Antenna 1540 may be a single antenna or an antenna array, or any other suitable antenna. Antenna 1540 may be capable of receiving wide bandwidth signals, e.g. third generation UMTS or fourth generation LTE signals. Antenna 1540 may receive signals, and in some embodiments may also transmit signals.

Signal 1570 may be transmitted and/or received between antenna 1540 and mobile antenna 1550. Signal 1570 may contain information, and may have certain characteristics, for example when mobile station 1560 may be in motion, a Doppler shift may be induced into signal 1570. Signal 1570 may have a signal pattern, e.g. a Doppler spread pattern, and/or may contain information, e.g. a delay profile. Mobile antenna 1550 may be a single antenna or an antenna array, e.g. a 4$^{th}$ generation system antenna, or any suitable antenna. Mobile station 1560 may be any transmission station, and may be fixed or mobile, at a given time. Mobile station 1560 may transmit using common protocols, e.g. cellular telephone protocols. Mobile station 1560 and mobile antenna 1550 may be contained in a same device, e.g. a cellular telephone or personal communication device.

Embodiments may estimate a target velocity using a variety of methods, for example a Doppler effect method may be used. A signal, $s(t)e^{j2\pi ft}$, may be transmitted by a mobile transmitter, e.g. a terminal, located at point $r_0$ and moving with a velocity $v_0$. $s(t)$ may be a complex envelope of a transmitted signal, that may be transmitted at transmission frequency f.

For example, a time-dependent vector, r, may describe a trajectory of a mobile transmitter in physical space. A terminal velocity vector v may be defined as:

$$v = \frac{dr}{dt} \quad \text{[Eqn 1]}$$

where $r_0$ may be a location vector at time of transmission, and $v_0$ may be a terminal velocity vector at that time.

A transmitted signal may originate from a point, and may travel from such point in all directions. Such a signal may be characterized by a spherical propagating wave, and may be described by a field intensity in space given by:

$$\vec{E}(r,t) = \frac{\vec{E}_0(t)}{|r|} \exp\left[j2\pi f\left(t - \frac{1}{c}i_k \cdot r\right)\right] \quad \text{[Eqn 2]}$$

$\vec{E}(r,t)$ may be a field vector in location r, as a function of time, and $\vec{E}_0(t)$ may be a field intensity at some reference distance, and may be proportional to a transmitted signal s(t). f may be a frequency of a wave, a vector $i_k$ may be a unit vector pointing to a wave propagation direction, and "·" is the scalar product.

A receiver may be located at point $r_r$ and may receive a signal. An observed frequency of the received signal may be shifted by the Doppler effect. The shift may be expressed as:

$$\Delta f = -\frac{1}{\lambda}\left|\frac{d(r_r - r_0)}{dt}\right| = -\frac{1}{\lambda}v_0 \cdot i_k \quad \text{[Eqn 3]}$$

An expression of a shift may neglect relativistic and/or other second order effects, for clarity purposes. $\lambda = c/f$ is a signal wavelength. A vector $i_k$ may be a propagation direction between a transmitter and a receiver, and may be a unit vector in a direction of $r_r - r_0$.

Figure 16:
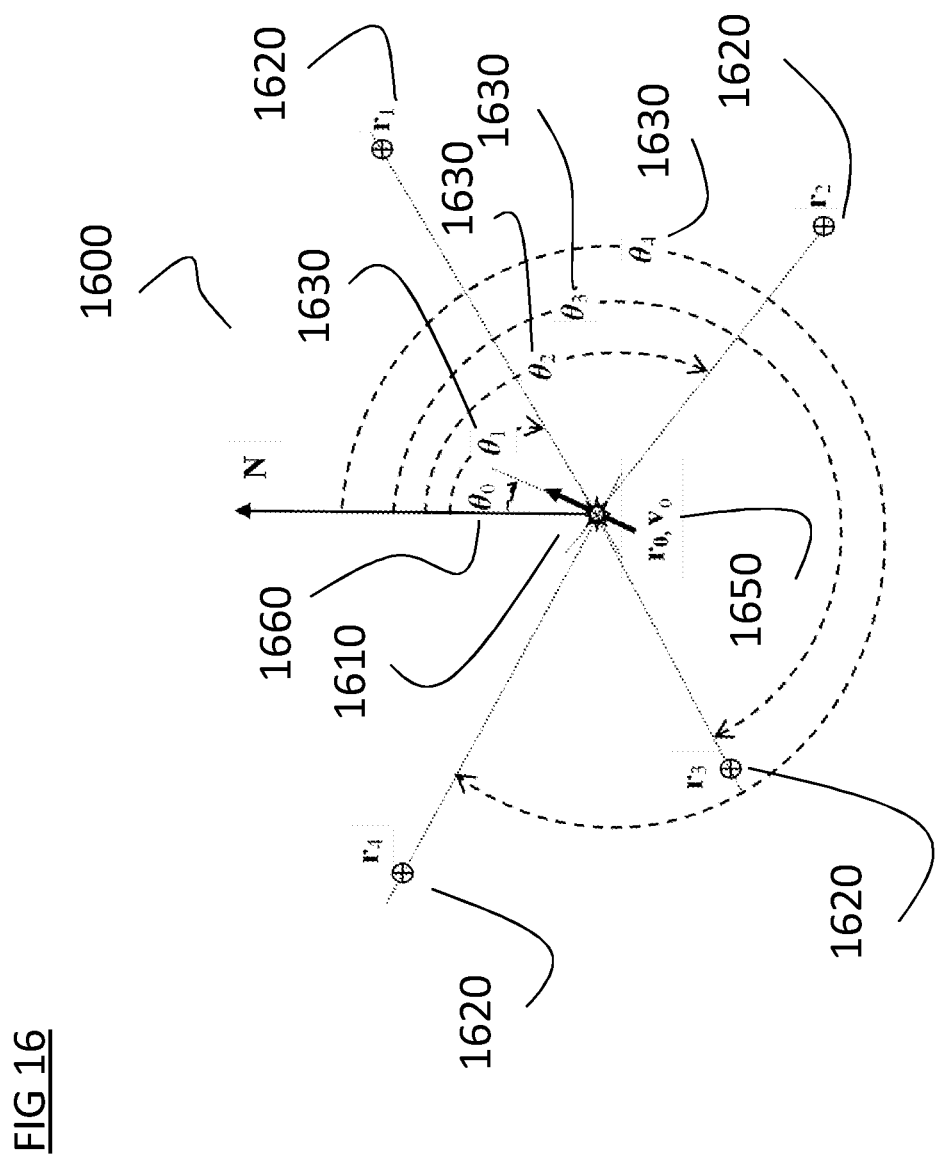
FIG. 16 depicts an exemplary diagram according to embodiments of the present invention.

Reference is made to FIG. 16, which depicts an exemplary configuration of mobile transmitters and receivers 1600. A set of receivers 1620 may be deployed around transmitter 1610. For example, a two dimensional problem may be considered, where substantially all receivers 1620 and a transmitter 1610 may be located within a same plane. For a set of N receivers 1620, where each may be located at a position represented by a position vector $r_k$, k=1, ..., N, and denoted by $\theta_k$ 1630, a corresponding azimuth to a position vector, a set of azimuths may be measured from known transmitter 1610 location in a direction of the receivers. Also, denote by $\theta_0$, azimuth 1660 of a transmitter velocity vector 1650, $v_o$.

A Doppler shift measurement at each receiver may be expressed as:

$$v_k = -\frac{1}{\lambda}|v_0|\cos(\theta_k - \theta_0) + v_b + \delta v_k \quad k = 1, \ldots, N \quad \text{[Eqn 4]}$$

Where $v_b$ may be a bias, and $\delta v_k$ may be a random measurement error, each which may be expressed separately as statistical properties of each may be different among receivers.

Several observations may be noted. In an embodiment, a transmitter and substantially all receivers may be phase synchronized, namely a precision of frequency measurement performed at each receiver may be high, and absolute Doppler shift measurements may be possible. When a transmitter location, and, for example, locations of receivers, may be known, as few as two receivers may be sufficient to determine a transmitter's velocity in terms of its speed and direction in a plane. In a case of three dimensions being considered, as few as three receivers may be needed. In an embodiment where substantially all receivers may be phase synchronized, but a transmitter may not be, at least one additional receiver may be needed, for example to extract additional frequency bias.

In an embodiment where a transmitter location may not be known, additional measurements may be required to extract a velocity. In such an exemplary case, at least three receivers may be needed, if, for example, a TOA method may be used, e.g. in space, or at least four receivers may be needed if, for example, TDOA may be used. A positioning technique may be as described herein.

Additional measurements, if available, may be used to average out measurement errors. An embodiment may include simplifying a problem of estimation of amplitude and phase of a noisy sinusoid. Another embodiment may include where a mobile transmitter may be a vehicle moving along a known trajectory, e.g. a road, and a velocity direction may be deduced according to a direction of the road, and in combination with other elements, e.g. elements that may be described by an equation set.

An embodiment of the invention may relate to a Doppler effect in a multi-path channel. A propagation medium, the physical atmosphere and/or obstacles, such as buildings, vegetation and/or other objects may interact with propagating electromagnetic waves. Propagation of radio waves for scenarios applicable to cellular technologies may be in accordance with established theory. A physical phenomena involved when an electromagnetic wave interacts with matter may be absorption, refraction, reflection, diffraction and scattering. When an electromagnetic wave may propagate through matter some of its energy may be absorbed by it. This may be referred to as the absorption phenomenon. When a wave hits another matter, some of its energy may be reflected back, some of it may be transmitted through into the other material, albeit with another propagation direction. These may be referred to as reflection and refraction effects. An amount of reflected energy, transmitted energy, as well as a direction of a transmitted wave depends on actual properties of materials at an interface. If a wave hits an obstacle, a wave propagation may be affected by a size of an obstacle as well as a material. If an obstacle may be larger than a wavelength, a wave may pass around an obstacle, for example, by diffraction. If a wave's length may be larger than an obstacle, a wave may be perturbed and it may be scattered in different directions.

An embodiment of the invention may relate to wireless cellular communications, operating in frequencies, for example, between approximately 700 MHz and 3000 MHz, e.g. wavelengths ranging between 40 cm and 10 cm. A propagation medium may be the lower layers of the atmosphere, and obstacles may be the ground, buildings and vegetation. Applicable link distances may be, for example, between a few tens of meters and a few kilometers. Propagation phenomena in such exemplary conditions may be reflections from the ground and walls, diffraction around buildings, scattering from vegetation and from building structures, which may be for example, by order of magnitude of tens of centimeters. Effects of absorption and refraction may be negligible. In such an exemplary embodiment, a channel propagation model that may describe a resulting waveform may be a multipath channel. In such model, a radiating wave may undergo a set of reflections, by buildings, walls etc. At a receiver a direct signal, if it may not be obstructed, may be received together with delayed versions of it, which may propagate via reflection and/or diffraction at or around obstacles.

Another embodiment may include a moving transmitter, where a signal may hit an obstacle and undergo a Doppler shift, according to Eqn 3, the magnitude of which may depend on a transmitter velocity and/or direction, for example, with respect to an obstacle. A signal received at a receiver may be given by:

$$y(t) = \sum_{l=1}^{L} a_l s(t-\tau_l) \exp[j 2\pi(f-v_l)(t-\tau_l)] = \tilde{y}(t) \exp[j 2\pi f(t-\tau_i)] \quad [\text{Eqn 5}]$$

Where $\tilde{y}(t)$ is a complex envelope of a received signal, and may be given by:

$$\tilde{y}(t) = \sum_{l=1}^{L} a_l s(t-\tau_l) \exp[-j 2\pi v_l(t-\tau_l)] \quad [\text{Eqn 6}]$$

A complex envelope of a resulting signal may be described as a convolution of a transmitted signal with an impulse response function of a channel, for example:

$$\tilde{y}(t) = s(t) * h(t) = \int_{-\infty}^{t} s(t-\tau)h(\tau, v) d\tau \quad [\text{Eqn 7}]$$

Where $h(\tau)$ is a channel impulse response and may be given as:

$$h(\tau, v) = \sum_{l=1}^{L} a_l \exp(j 2\pi v \tau) \delta(\tau-\tau_l) \delta(v-v_l) \quad [\text{Eqn 8}]$$

Embodiments of the invention may use ray tracing techniques to predict different paths and a power of each ray. A prediction may not be used only for intensity measurement prediction estimation, but also for path prediction and location. A Ray Tracing algorithm may be as described herein. A result of a ray tracing process may be a list of rays that may correspond to a possible reception point. For each ray it may be deduced a power it may carry, a distance it may travels and an angle of arrival at a destination. It may also be noted that due to the reciprocity principle, a same process may be applied, for example, starting from a receive point towards a transmit point. A resulting list of rays may be used to comprise a power delay profile and/or power angle profile of a particular channel. Namely, it may be deduced a power that may be expected to be received as a function of delay and/or angle. Phase information of each ray may not be available, since it may require geographical database accuracy on an order of magnitude of a fraction of a wavelength, e.g. about 1 cm accuracy or better for a typical cellular signal.

Embodiments of the invention may estimate a velocity of a mobile station in a multipath channel. Using a geographical database, which may include mapping of possible obstacles, and following a positioning procedure, e.g. similar to such a procedure described herein, it may be possible to learn, for example by Ray Tracing, an actual location in space of scatterers that may affect a received signal. Using a frequency domain analysis, e.g. a Fourier Transform or another frequency estimation technique, it may be possible to measure a Doppler shift that may be associated with each obstacle and using such various measurements deduce a mobile transmitter velocity vector.

A system may be composed of a set of passive receivers that may be distributed in, for example, an urban area. Receivers may be assumed to be capable to receive, demodulate and/or decode a received signal, or for example, control signals that may be transmitted by a mobile terminal. Such signals, e.g. training symbols, pilots, reference signals, preamble, midamble, sounding signals, etc., may be essential to an operation of a cellular system itself and may be found in transmission signals of, for example, substantially all cellular systems, as may be specified in various standards. Such a requirement may imply that receivers may be frequency synchronized, phase synchronized, and/or frame and symbol synchronized with a transmitted signal. For Doppler processing, a residual frequency offset may not be neglected.

Figure 17:
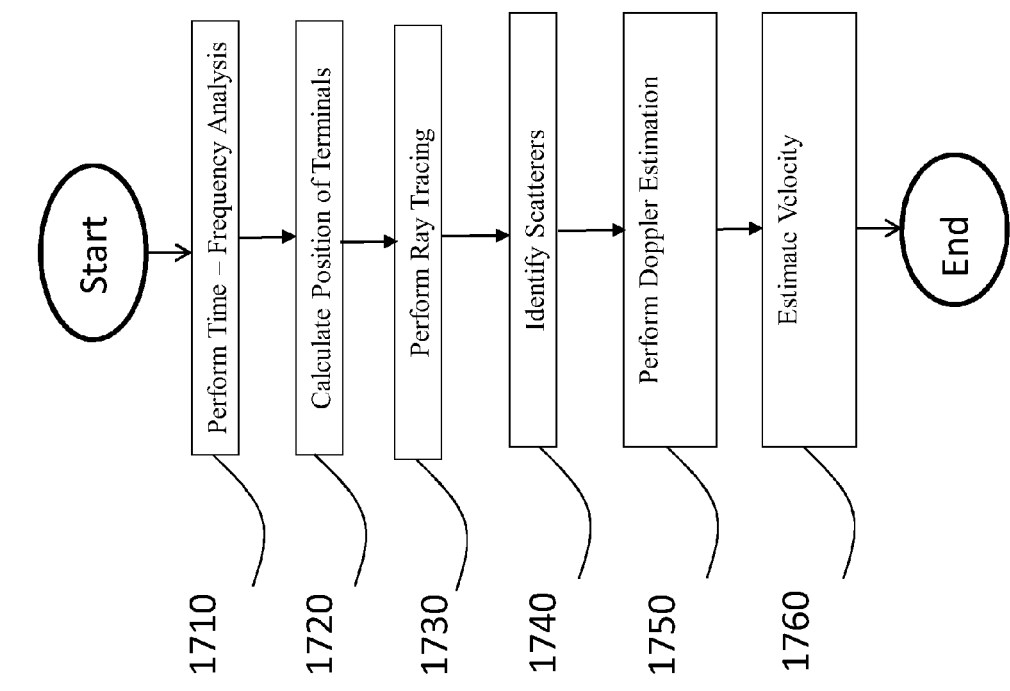
FIG. 17 depicts a method according to embodiments of the present invention.

An estimation process may be described by reference to FIG. 17. An algorithm may estimate a mobile terminal's velocity, and such estimation may be based on reception of signals from receivers. A time frequency analysis of received signals may be performed 1710, which may resolve signal components, for example that may be described by Eqn. 5, to a contribution of each scatterer in a signal path. Such analysis 1710 may result in profiles, or delay profiles, being calculated. A time frequency analysis of received signals 1710 may be performed for each receiver that may be operating in a system. Scatterers within a propagation channel may be resolved and may be located on a map, e.g. a delay-Doppler map. Using delay profiles, a position of a mobile terminal may be calculated 1720. Ray tracing may be performed 1730, or another analysis that may produce a same result may be used. A ray tracing profile of each receiver may be matched to a Time-Frequency profile that may have been obtained 1710 and scatterers may be identified 1740. Identification of scatterers 1740 may be performed by calculating, for example, scatterers that may contribute to a range gate, and determining scatterers that may affect a Doppler spectrum. An azimuth of each scatterer may be, for example, predicted by ray tracing, and an angular location and a strength of a scatterer may be calculated. A Doppler shift induced to a ray that traveled via a particular scatterer may be estimated 1750. A best bias, for example, may be calculated and found that may be a best fit of a Doppler spectra that may be calculated from a time-frequency analysis 1710. A Doppler estimation may be performed, for example, by Doppler values at a range gate being estimated from a profile that may be computed, e.g. as by Eqn. 9. A set of Doppler estimations may be used together with a mobile terminal location and scatterers, and a locating set of equations may be formed, e.g. as in Eqn. 4. A solution to such an equation set may be calculated, and may be used to estimate a velocity 1760, e.g. of a mobile device. A consistent solution to such a set of equations may also be used to estimate a target velocity vector.

A time frequency analysis may be further described as follows. $\tilde{y}_i(t)$ may denote a complex envelope of a received signal, which may be readily obtained after down converting a received signal, for example a constant phase shift and frequency deviation, which may be ignored, for clarity, in a derivation, but may be introduced as a bias in a measurement. A simple time-frequency analysis may be matched-filtering of a received signal with a delayed and Doppler shifted version of a transmitted signal, which may be assumed to be known, and may be identified by:

$$r(\tau, v) = \tilde{y}(t) * s^*(-t)\exp(j2\pi vt) = \int_{-\infty}^{\tau} \tilde{y}(\tau)s^*(\tau-t)\exp[j2\pi v(\tau-t)]dt \quad [\text{Eqn 9}]$$

Substituting equations (7) and (8) into equation (9), results in the following:

$$r(\tau, v) = \sum_{l=1}^{L} a_l \chi_s(\tau-\tau_l, v-v_l)\delta(\tau-\tau_l)\delta(v-v_l) \quad [\text{Eqn 10}]$$

where $\chi_s(\tau,v)$ is a response of a matched filter to a single replica of a received signal, and may be given by:

$$\chi_s(\tau, v) = \int_{-\infty}^{\infty} s(t)s^*(t-\tau)e^{j2\pi vt}dt \quad [\text{Eqn 11}]$$

This function may be referred to as an ambiguity function of a transmitted signal. Such an operation may resolve various scatterers of a propagation channel and may present their location on a delay-Doppler map. A resolution of a resulting map may be limited by a bandwidth and/or coherence time of a transmitted signal. Since a transmission may be continuous, a resolution in a Doppler domain may be made relatively small, and may be limited by a mobile terminal velocity and/or acceleration.

In some embodiments, Doppler values at range gate $\tau_i$ may be estimated from a profile computed, for example, by Eqn 9. An estimation process may involve a computation of local maxima of a resulting profile, a problem which may have a mathematical solution as well as, for example, an application to radar systems or other systems. Such a computation may be done for range gates in which a limited number of scatterers may be identified and/or resolved, and a requirement for a complete model may be avoided. A profile may be determined from matched filtering, and a profile may be used to compute local maxima. Such a computation may produce an incomplete, or partial, model, and a partial model may be used to compute a velocity estimate. Local maxima at each range gate may be found, for example, by using a one dimensional steepest decent method, as may be applied to specific intervals for which values of r(t) in Eqn 9 may exceed a given threshold. Another possible exemplary method may be clustering. In such a method, range-gate/Doppler bins in which an amplitude may exceed a threshold, may be collected, and those which may be close together may be clustered. An actual range and Doppler of each cluster may be estimated as an average of a range, and Doppler values of each of the bins which may comprise that cluster, may be weighted by their intensity.

Such exemplary algorithms may be used for an analysis. Other algorithms as may be known, such as Multiple Signal Classification (MUSIC), Minimum Variance Distortionless Response (MVDR) and/or others may also be used to extract Doppler values per range gate. Deconvolution techniques, e.g. CLEAN, or similar may be used to further improve and/or resolve various scatterers. Such a process may be performed for each receiver in a system.

A position of a terminal may be determined using a method as described herein, or any other suitable method.

Embodiments of the invention may identify scatterers and may use Doppler estimation. Following a determination of a terminal location, it may be possible to compute, for example, via ray tracing, scatterers that may contribute to each range gate. Scatterers that may affect a Doppler spectrum may be those from which respective rays may be first reflected. An azimuth of each scatterer at a given range gate, $\tau=\tau_i$, as may be predicted by a Ray Tracing stage, may be given by a set $\{\theta_1, \ldots, \theta_k\}$. An angular location and strength of scatterers may be distributed on an angular axis $\theta$ and may be described, for example, by the function:

$$f(\theta) = \sum_{k=1}^{K} a_k \delta(\theta - \theta_k) \quad [\text{Eqn 12}]$$

An angular axis, $\theta$, may be circularly rotated by $\theta_0$, and then may be transformed into a Doppler axis by, for example, a nonlinear cosine operation, with axis expansion by a factor of $v_0$ and possibly a linear shift by a constant bias, $v_b^j$, that may be caused by an inherent frequency offset between a transmitter's and a receiver j's oscillators. Such a transformed function may then be convolved by the ambiguity function, and may be contaminated by noise to obtain a received signal. Coefficients $a_k$ may be stochastic, e.g. each scatterer may be, in principle, made of a plurality of objects within a Delay-Doppler bin, which may interfere with each other. Doppler estimation may then be used to obtain the best couple $\{v_0,\theta_0\}$ and possibly a set of biases $\{v_b^j\}_{j=1}^{J}$ that may best fit a Doppler Spectra that may be obtained by a Time-Frequency analysis stage, as described above, for substantially all delay bins and for substantially all receivers in a system.

A possible estimation algorithm of an embodiment may include a formation of an expected Doppler power spectrum, at a given range gate:

$$\hat{r}(\tau, v \mid \theta_0, v_0, i, j) = \quad [\text{Eqn 13}]$$

$$\sum_{k=1}^{K} E\{|a_k|^2\} |\chi_s[\tau - \tau_i, v - v_0\cos(\theta_k - \theta_0) - v_b^j]|$$

$$\delta[v - v_0\cos(\theta_k - \theta_0) - v_b^j]$$

It may be matched to a received signal power spread function. An estimated Doppler vector may then be found as values that may bring to a minimum an error function:

$$\{\hat{v}_0, \hat{\theta}_0\} = \underset{\theta_0, v_0}{\arg\min} \sum_j \underset{v_b^j}{\min} \sum_i [E\{|r(\tau, v)|^2\} - \hat{r}(\tau, v|\theta_0, v_0, i, j)]^2 \quad [\text{Eqn 14}]$$

where a power averaging of a received signal may be performed over several periods of transmission, and may be taken at sampling intervals that may be larger than the coherence time of a channel, for example to enable reliable estimation. Such an implementation may require a search, e.g. a multi-dimensional search that may include receivers' biases, and may be a more difficult implementation of the method. Additionally it may be required, for this method, that a ray tracing analysis may provide an accurate and a reliable model of a propagation environment, which may not always be the case.

Another embodiment may be based on Doppler estimation for a Time-Frequency Analysis stage. For receiver j, each scaterrer in a given range gate may result in an equation similar to Eqn 4:

$$v_k^j = -\frac{1}{\lambda}|v_0|\cos(\theta_k^j - \theta_0) + v_b^j + \delta v_k^j \quad [\text{Eqn 15}]$$

$$k = 1, \ldots, N_j$$

A set of such equations may be formed for substantially all range gates in which Doppler estimation may be performed, and for each scatterer that may be identified in each range gate. A minimum number, e.g. at least 3, or in a case of a non-planar problem, 4, equations may be needed to solve for a velocity absolute value and direction. An estimation problem that may be described may be a problem of estimating an amplitude, phase and/or bias of a sinusoid in a noisy environment, for example one similar to the one discussed in [3]. A possible solution may be to represent the equations in terms of Cartesian components:

$$v_k^j = v_x \cos(\theta_k^j) + v_y \sin(\theta_k^j) + v_b^j + \delta v_k^j \quad [\text{Eqn 16}]$$

$$k = 1, \ldots, N_j$$

with $v_x = -\frac{1}{\lambda}|v_0|\cos(\theta_0)$, $v_y = -\frac{1}{\lambda}|v_0|\sin(\theta_0)$.

Using such a definition, a set of equations may be written as:

$$V = Hx + n \quad [\text{Eqn 17}]$$

where, $$V = \begin{bmatrix} v_1^1 \\ \vdots \\ v_{N_1}^1 \\ v_1^2 \\ \vdots \\ v_{N_2}^2 \\ \vdots \\ v_{N_J}^J \end{bmatrix}, H = \begin{bmatrix} \cos(\theta_1^1) & \sin(\theta_1^1) & 1 & 0 & \ldots & 0 \\ \vdots & \vdots & \vdots & \vdots & & \vdots \\ \cos(\theta_{N_1}^1) & \sin(\theta_{N_1}^1) & 1 & 0 & \ldots & 0 \\ \cos(\theta_1^2) & \sin(\theta_1^2) & 0 & 1 & \ldots & 0 \\ \vdots & \vdots & \vdots & \vdots & & \vdots \\ \cos(\theta_{N_2}^2) & \sin(\theta_{N_2}^2) & 0 & 1 & \ldots & 0 \\ \vdots & \vdots & \vdots & \vdots & & \vdots \\ \cos(\theta_{N_J}^J) & \sin(\theta_{N_J}^J) & 0 & 0 & \ldots & 1 \end{bmatrix}, \quad [\text{Eqn 18}]$$

$$x = \begin{bmatrix} v_x \\ v_y \\ v_b^1 \\ \vdots \\ v_b^J \end{bmatrix}, n = \begin{bmatrix} \delta v_1^1 \\ \vdots \\ \delta v_{N_1}^1 \\ \delta v_1^2 \\ \vdots \\ \delta v_{N_2}^2 \\ \vdots \\ \delta v_{N_J}^J \end{bmatrix}$$

Error values, $\delta v_k^j$, may be independent and their standard deviation may be estimated, e.g. proportional to the inverse of a signal to noise ratio for each of the relevant peaks. Such a value may be estimated using a ray tracing analysis, or, preferably, from a Doppler spectrum profile.

$$(\sigma_k^j)^2 = \frac{k}{E[|a_k^j|^2]} \quad [\text{Eqn 19}]$$

with k, as a constant.

A weighted least square estimator may be made:

$$\hat{x} = (H^t W H)^{-1} H^t W V \quad [\text{Eqn 20}]$$

with W being a diagonal matrix in which:

$$w_{ii} = \frac{1}{(\sigma_k^j)^2}, i = \sum_0^{J-1} N_j + k, N_0 = 0$$

If there may be several scatterers in a given range gate, an association of extracted Doppler values and scatterers, as may be computed by a ray tracing analysis, may, in some cases, be ambiguous. A possible solution may be by forming, for each ambiguous case, a distinct set of equations and selecting a solution of an unambiguous set. In case of a weighted least square solution, the right solution may be made by choosing one that may minimize a residual error:

$$\epsilon_{res} = \|V - H\hat{x}\| \quad [\text{Eqn 21}]$$

Such a process may be subject to errors that may result from various sources, and such errors may be identified and analyzed. An error may be Doppler estimation error, which may include errors caused by, for example, noise, clustering, sidelobes and terminal movements. Another error may be propagation model error, that may result in wrong obstacle location, missing obstacles and/or erroneous rays directions. An error may be a Network database error, that may be caused by a wrong base station location, wrong antenna data, wrong power data, etc. An error may be an error in terminal location, for example one upon which a Doppler estimation may be based.

A Doppler estimation error may be present. A signal r(t) may be a received signal at a sensor. There may be several methods to measure a signal Doppler shift. A variety of methods may appear in various communication and radar literature. A basic accuracy, in terms of a standard deviation, of a Doppler measurement of a signal embedded in noise may be given by:

$$\sigma_v = \frac{1}{T_i \sqrt{SNR}} \quad \text{[Eqn 22]}$$

where SNR is a signal to noise ratio at which a signal may be received. $T_i$ is an integration time of a signal, namely a length of a time interval upon which a signal may be captured. The term $v_{res}=1/T_i$ is a basic Doppler resolution of a measurement.

In addition to thermal noise, Doppler estimation accuracy of a peak produced by one ray may also be affected by a response of an estimator to other rays. In an exemplary case of a matched filter estimator, e.g. as described by Eqn 9, such an effect may be partitioned into an effect of the rays which may be within a range-Doppler resolution cell of an estimated ray, e.g. a mainlobe effect, and rays outside such a resolution cell, e.g. a sidelobe effect. A first group of rays may cause broadening of a peak, a second may be treated as addition to a noise level, and may reduce an effective SNR. An actual level of sidelobes may depend on a signal being transmitted. Other estimation techniques may mitigate effects of noise and/or low resolution effects, e.g. mainlobe effects. Deconvolution techniques may be used to mitigate sidelobe effects.

As may be described, for example, by Eqn 22, increasing an integration time may reduce a standard deviation of a Doppler estimation error, however, a terminal motion may shift it out of a range gate, and a terminal acceleration, if it may exist, may shift it out of a Doppler resolution cell. Each of such effects may reduce an effective signal to noise ratio and may limit an integration time.

A propagation model error may be identified and described. A method may be based on estimation of a time and direction of arrivals of rays, and may be based on a ray tracing model. In some cases, geographical information on which a calculation may be based on may be complete, but errors in implementation may result, for example because of computation power and/or computation time limitations, which may result in a low resolution of calculation, e.g. using a small number of rays in a case of ray tracing using the ray launching method, or too small of a reflection nesting in a case of ray tracing using the method of reflections etc. An important source of error may be an erroneous, incomplete or outdated geographical database. A geographical database may include a detailed description, for example accurate to an order of a wavelength, of substantially all obstacles that may affect a propagating electromagnetic wave. A description may include a location, orientation, size, shape, surface roughness, texture and/or type of material an obstacle may be made of. Information that may be accurate to such a level of detail may typically not be available, e.g. in an urban environment, which may be constantly changing. Errors caused by database incompleteness may be difficult to quantify generally, but effects of such errors on a final accuracy may depend on an actual implementation.

Network database errors may be identified and described. Such a method may be based on accurate knowledge of receiver locations, antenna pattern and/or direction, as well as a mobile transmitter antenna pattern. Such information may be generally available however, there may be errors associated with this information.

Terminal location errors may be identified and described. Accurate terminal location may be essential in determining a propagation environment and estimation of a velocity.

An effect of each type of error may be dependent on a particular embodiment. An implementation that may be based on a Doppler spectrum shape correlation, as may be described by Eqn 13 and Eqn 14 may not require any direct Doppler estimation, and may not be affected by a Doppler estimation error. It may be highly sensitive to model accuracy. An implementation that may be based on Doppler estimation, for example, as may be described by Eqn 15-Eqn 21 may require Doppler estimation and may be more sensitive to Doppler estimation errors. It may not require a fully accurate database, as a system may concentrate on a few main obstacles.

Figure 18:
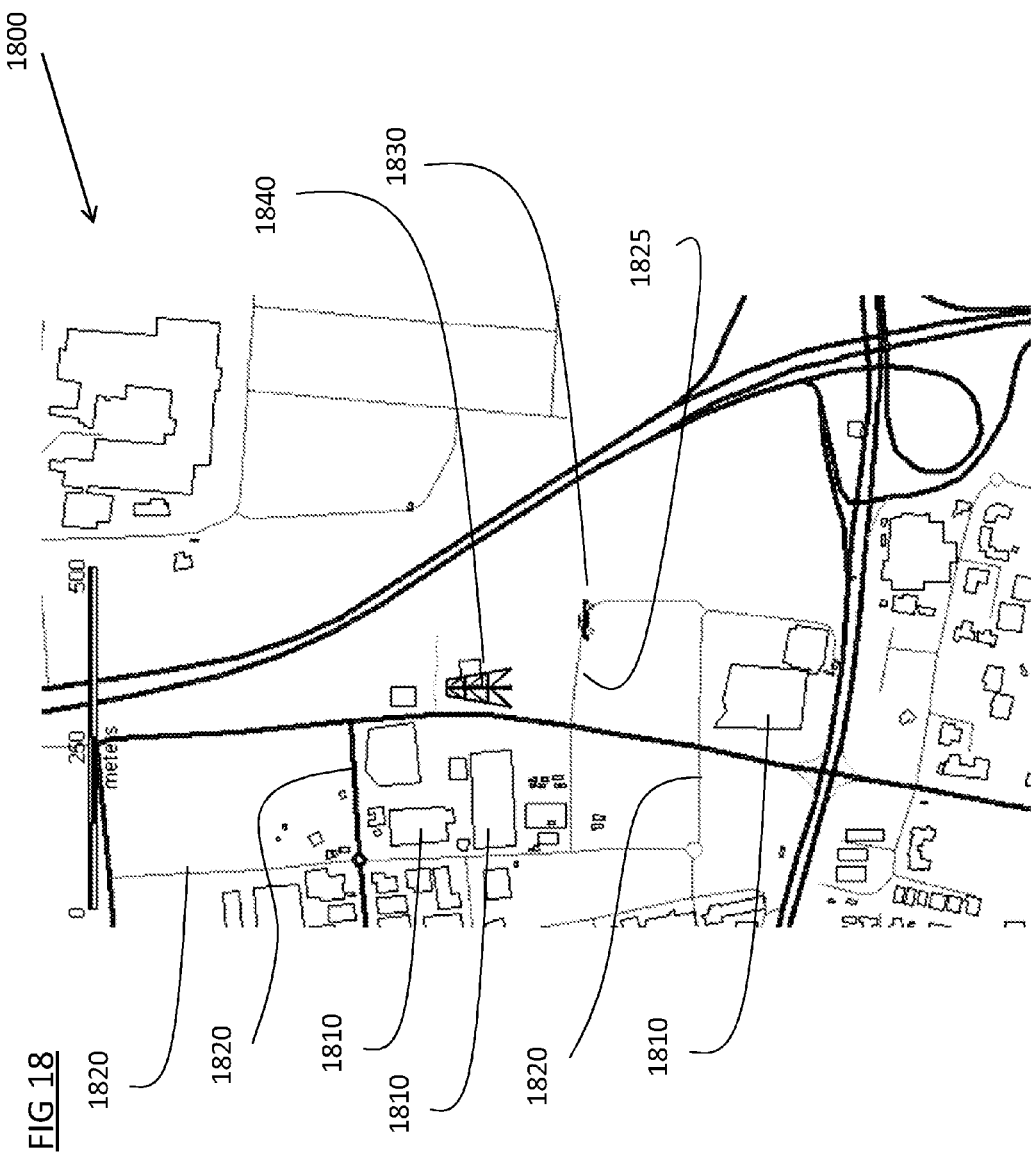
FIG. 18 depicts an exemplary diagram according to embodiments of the present invention.

A simulation may be used to illustrate a process according to an exemplary embodiment. FIG. 18 depicts a map of an exemplary physical area 1800, and may include buildings 1810 and streets 1820. A mobile terminal 1830, of which a velocity may be determined, may be depicted, e.g. by a vehicle icon. A sensor location 1840 may be depicted, e.g. by a tower icon, and may be, for example, 160 m away from mobile terminal 1830. In such an exemplary simulation, vehicle 1830 may be moving, e.g. westward, along a road 1825 with a velocity, e.g. of 20 m/s, on an azimuth, e.g. of 293°. Ray tracing analysis may be performed for such an exemplary point. Following additional calculations, a velocity of mobile terminal 1830 may be found.

Figure 19:
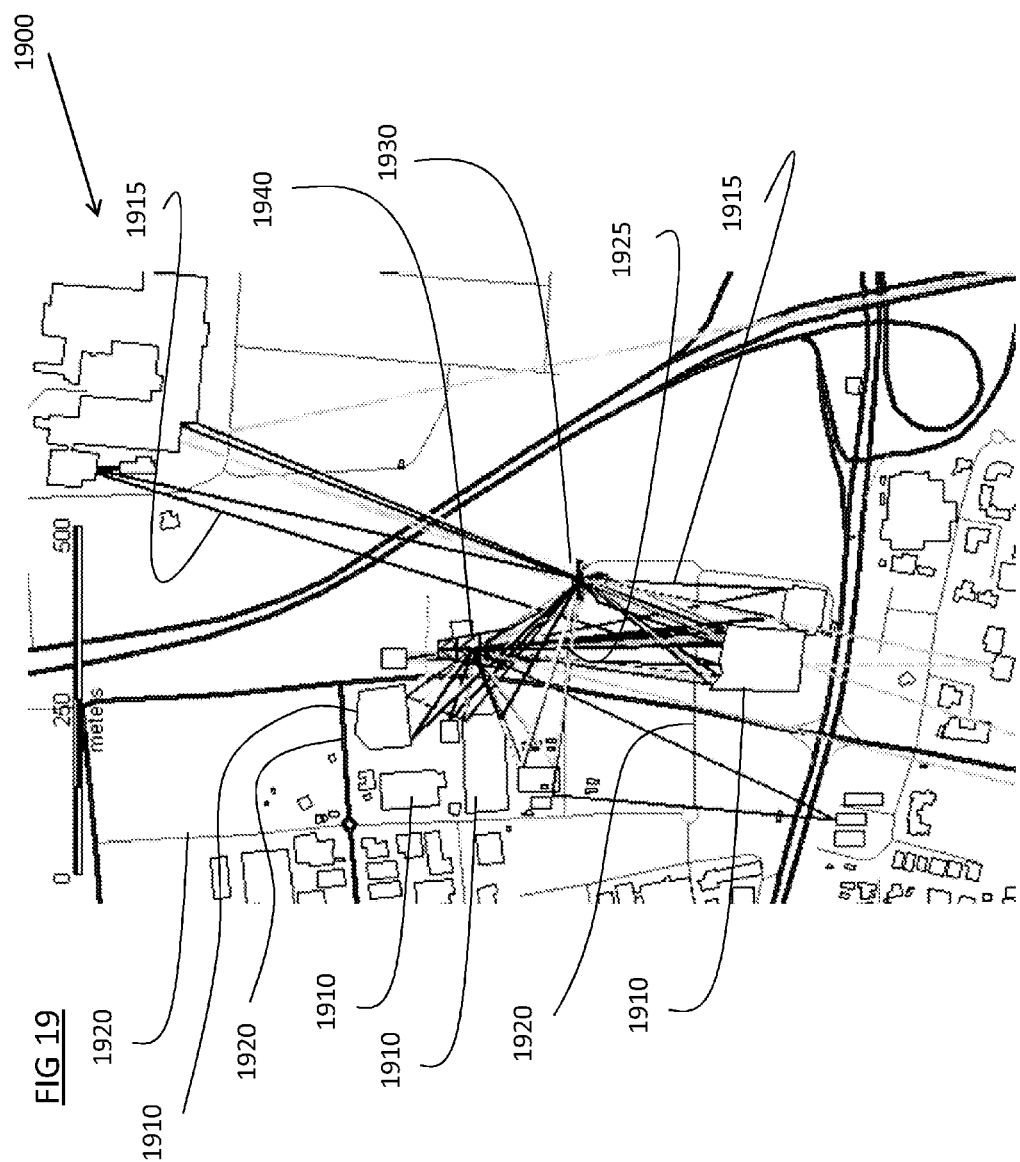
FIG. 19 depicts an exemplary diagram according to embodiments of the present invention.

Reference is now made to FIG. 19. A set of rays 1915 that may result from a ray tracing analysis, may take into account reflections and/or diffractions, and may be depicted 1900, as may be overlayed on a map. A ray tracing analysis may be performed using an exemplary physical area 1900 (which may correspond to an exemplary physical area 1800 of FIG. 18), and may include buildings 1910 (1810) and streets 1920 (1820). A mobile terminal 1930 (1830), of which a velocity may be determined, may be depicted, e.g. by a vehicle icon. A sensor location 1940 (1840) may be depicted, e.g. by a tower icon, and may be a distance away from mobile terminal 1930 (1830). In such an exemplary simulation, a vehicle 1930 (1830) may be moving along a road 1925 (1825) with a velocity on an azimuth. Rays 1915 that may be determined may be referenced to a geographical database, and may aide in determining locations of rays 1915 with respect to objects. Using rays 1915 that may be referenced to objects, calculations may be performed to determine a velocity of mobile terminal 1930.

Figure 20A:
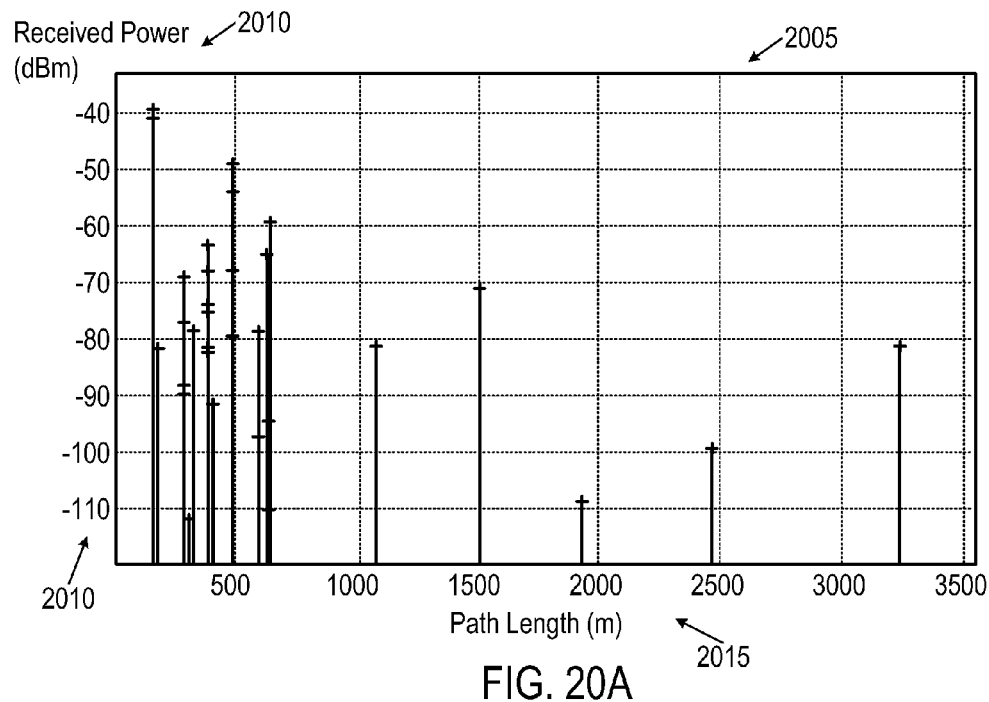
FIG. 20A depicts an exemplary diagram according to embodiments of the present invention.
Figure 20B:
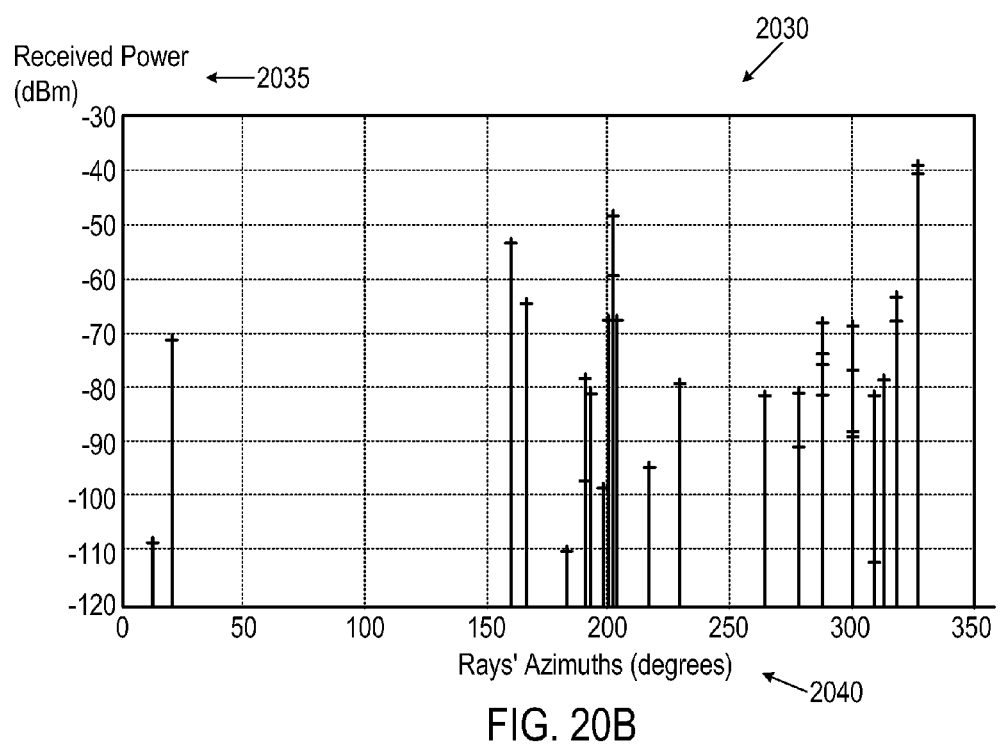
FIG. 20B depicts an exemplary diagram according to embodiments of the present invention.
Figure 20C:
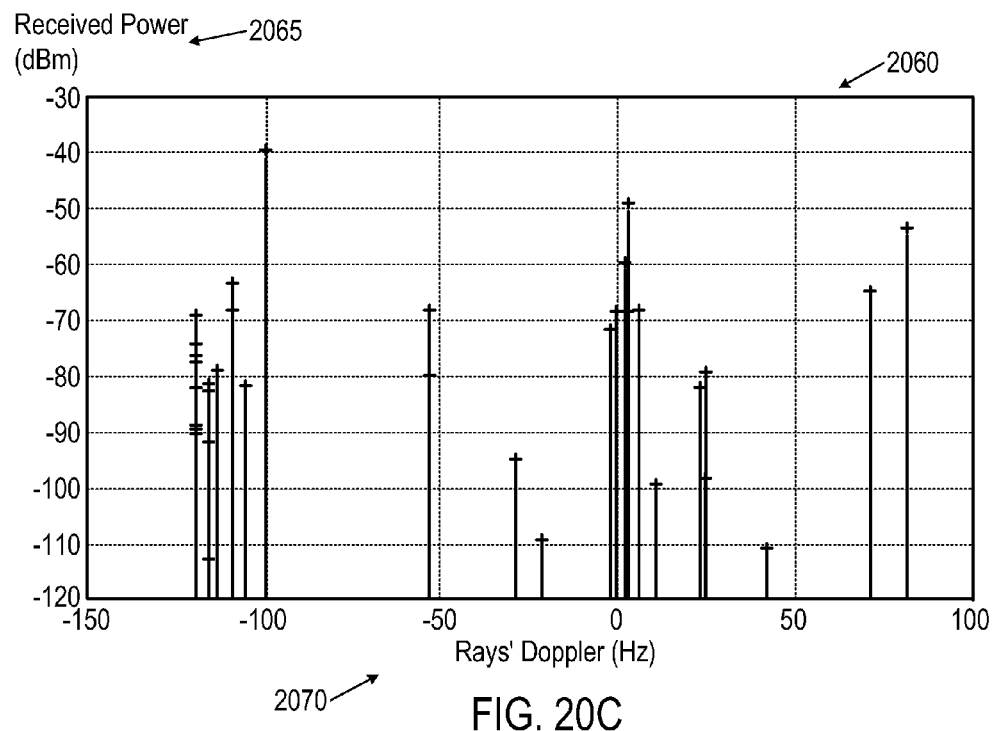
FIG. 20C depicts an exemplary diagram according to embodiments of the present invention.

Reference is now made to FIG. 20. A delay profile of rays, e.g. 1915 as in FIG. 19, may be measured by an ideal receiver at a base station. Such a profile 2005 may be depicted by FIG. 20A. A received power 2010 of each ray may be plotted, and each ray may be referenced by a path length 2015. FIG. 19B shows an azimuth profile 2030, from a point of view of a mobile station, or transmitter. A received power 2035 of each ray may be plotted, and each ray may be referenced by an azimuth 2040. For a transmitted signal, a simulation of a UMTS signal may be made, where a set of pseudo random chips, e.g. taking values of +1 or −1, at a rate, e.g. of 3.64 chips per second, modulating a carrier, e.g. of 1800 MHz. At such an exemplary frequency, and considering a velocity of a mobile transmitter, an azimuth profile may be translated to a Doppler frequency profile (which may be referred to, for simplicity, as a Doppler profile). Such an exemplary Doppler profile 2060 may be plotted and depicted by FIG. 20C. A received power 2065 of each ray's Doppler profile may be plotted, and each ray's Doppler profile may be referenced by a corresponding Doppler frequency 2070.

Rays may be sorted, for example, according to each ray's path length. Rays may be listed with a corresponding path length, azimuth and power, for example as in the following table, and may be from a ray tracing analysis.

| No. | Path Length (m) | Azimuth (Degrees) | Relative Power (dBm) | Apparent Doppler (Hz) |
|---|---|---|---|---|
| 1 | 152.56 | 327.00 | −39 | −99.48 |
| 2 | 152.77 | 327.00 | −41 | −99.49 |
| 3 | 174.03 | 264.51 | −82 | −105.46 |
| 4 | 282.25 | 299.86 | −69 | −119.14 |

-continued

| No. | Path Length (m) | Azimuth (Degrees) | Relative Power (dBm) | Apparent Doppler (Hz) |
|---|---|---|---|---|
| 5 | 282.50 | 299.86 | −88 | −119.14 |
| 6 | 282.73 | 299.86 | −89 | −119.14 |
| 7 | 282.98 | 299.86 | −90 | −119.14 |
| 8 | 283.58 | 299.86 | −77 | −119.14 |
| 9 | 304.58 | 309.15 | −112 | −115.26 |
| 10 | 304.79 | 309.15 | −112 | −115.26 |
| 11 | 305.05 | 309.15 | −112 | −115.26 |
| 12 | 321.00 | 312.62 | −79 | −113.03 |
| 13 | 383.59 | 317.97 | −68 | −108.78 |
| 14 | 384.71 | 317.97 | −63 | −108.78 |
| 15 | 385.17 | 287.84 | −68 | −119.51 |
| 16 | 385.99 | 287.12 | −74 | −119.37 |
| 17 | 387.12 | 287.12 | −82 | −119.37 |
| 18 | 387.16 | 287.84 | −76 | −119.51 |
| 19 | 389.57 | 309.15 | −82 | −115.26 |
| 20 | 398.68 | 278.06 | −92 | −115.94 |
| 21 | 481.58 | 201.61 | −49 | 2.92 |
| 22 | 481.69 | 201.61 | −49 | 2.92 |
| 23 | 482.06 | 201.76 | −68 | 2.61 |
| 24 | 482.12 | 200.12 | −68 | 6.03 |
| 25 | 482.22 | 203.36 | −68 | −0.76 |
| 26 | 485.94 | 229.32 | −79 | −53.20 |
| 27 | 487.38 | 160.55 | −54 | 80.99 |
| 28 | 596.31 | 191.09 | −79 | 24.76 |
| 29 | 596.50 | 191.09 | −97 | 24.76 |
| 30 | 623.26 | 166.50 | −65 | 71.38 |
| 31 | 625.25 | 182.50 | −110 | 42.02 |
| 32 | 632.64 | 216.87 | −95 | −28.77 |
| 33 | 638.17 | 202.26 | −59 | 1.54 |
| 34 | 1076.47 | 277.28 | −81 | −115.51 |
| 35 | 1503.76 | 22.06 | −71 | −1.98 |
| 36 | 1931.37 | 12.75 | −109 | −21.35 |
| 37 | 2463.91 | 197.88 | −99 | 10.70 |
| 38 | 3239.06 | 191.78 | −81 | 23.34 |
| 39 | 5196.36 | 18.95 | −98 | −8.47 |

Each ray may be, for example according to simulation parameters, as may be measured, e.g. at a base station.

Figure 21A:
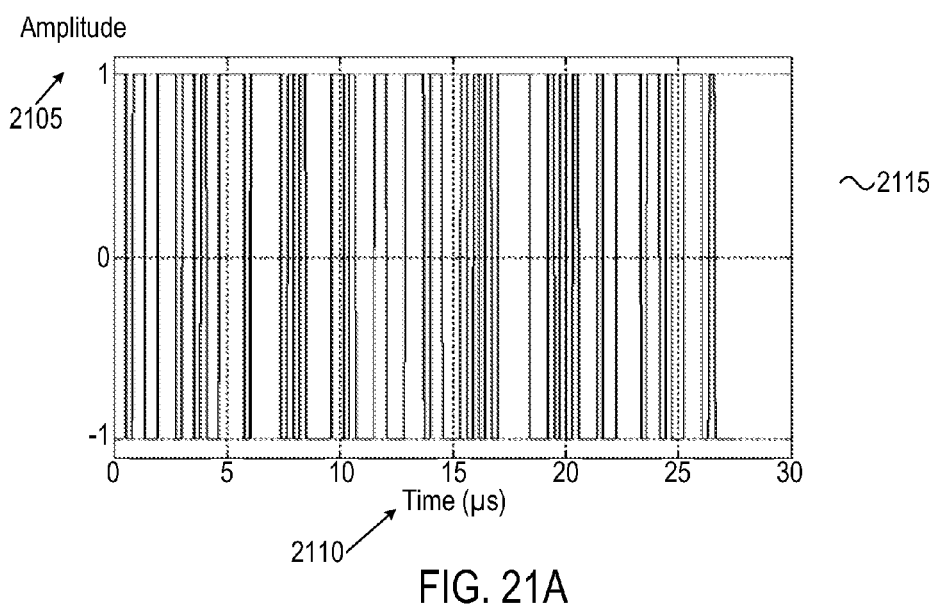
FIG. 21A depicts an exemplary diagram according to embodiments of the present invention.
Figure 21B:
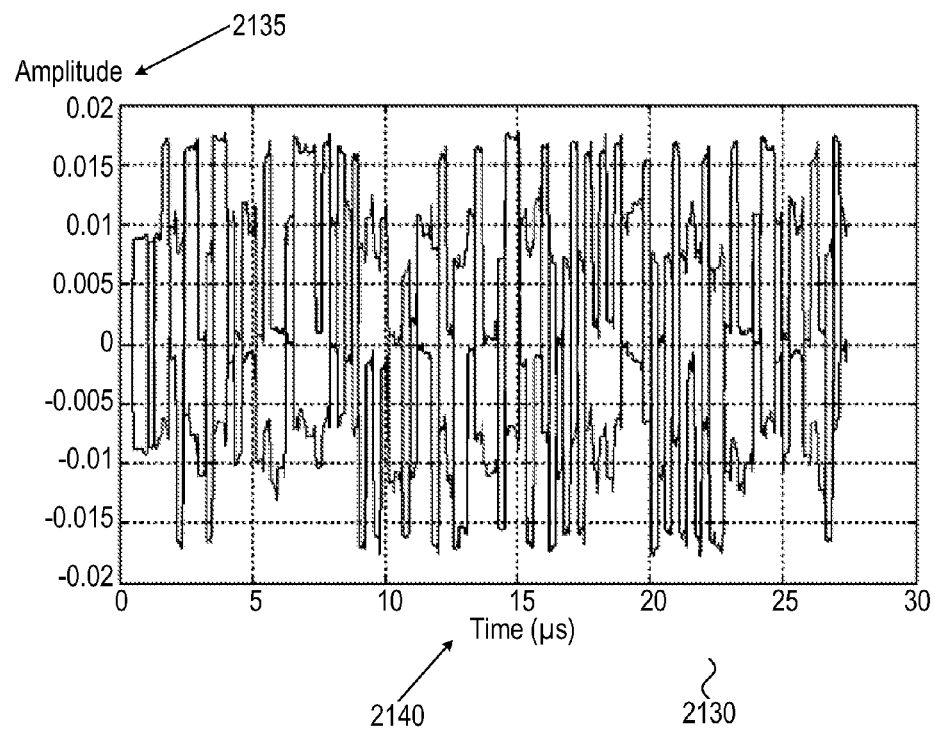
FIG. 21B depicts an exemplary diagram according to embodiments of the present invention.

An exemplary embodiment of a processing scenario may be described by reference to FIG. 21. A signal may be represented by chips, and a first set of chips 2115, e.g. 1000 chips, may be depicted in FIG. 21A. An amplitude 2105 of each chip may be referenced to a time 2110 each chip may be processed. FIG. 21B shows, for a same period of time as shown by FIG. 21A, real and imaginary components of a complex envelope of a received signal 2130, which may pass through a channel, as, for example, may be described by Eqn 6. An amplitude 2135 of such a complex envelope may be referenced to a corresponding time period 2140, where such time period corresponds to a time period 2110 of FIG. 21A. Noise may be added to a result. In some exemplary embodiments, such as depicted by a demonstration of FIG. 21, a signal to noise ratio may be large, e.g. 50 dB.

Figure 22A:
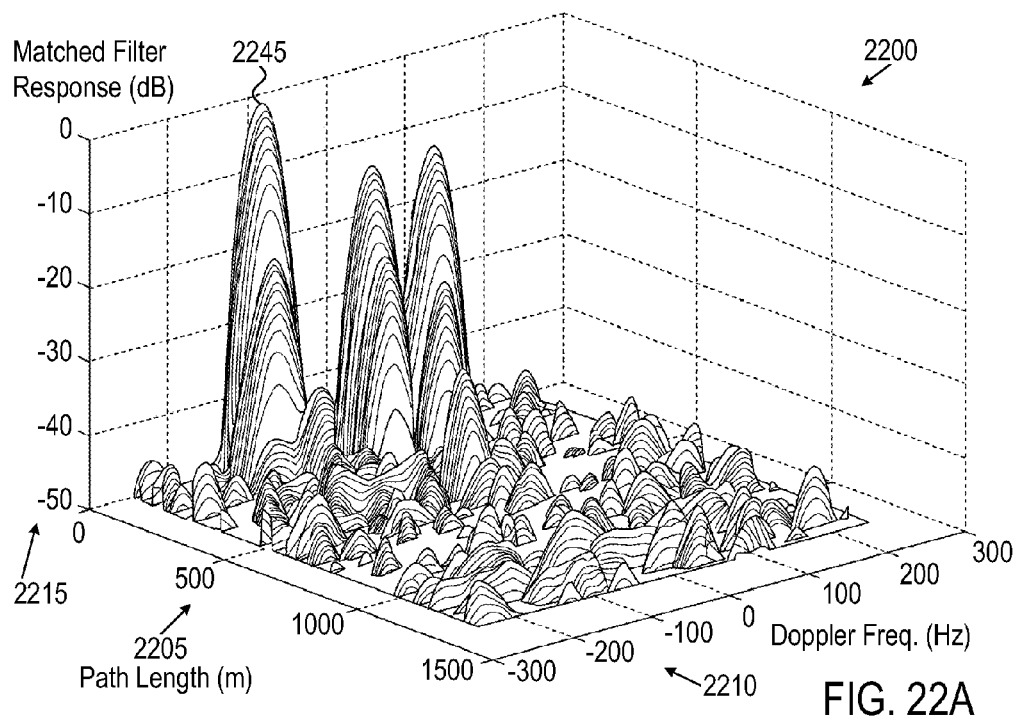
FIG. 22A depicts an exemplary diagram according to embodiments of the present invention.
Figure 22B:
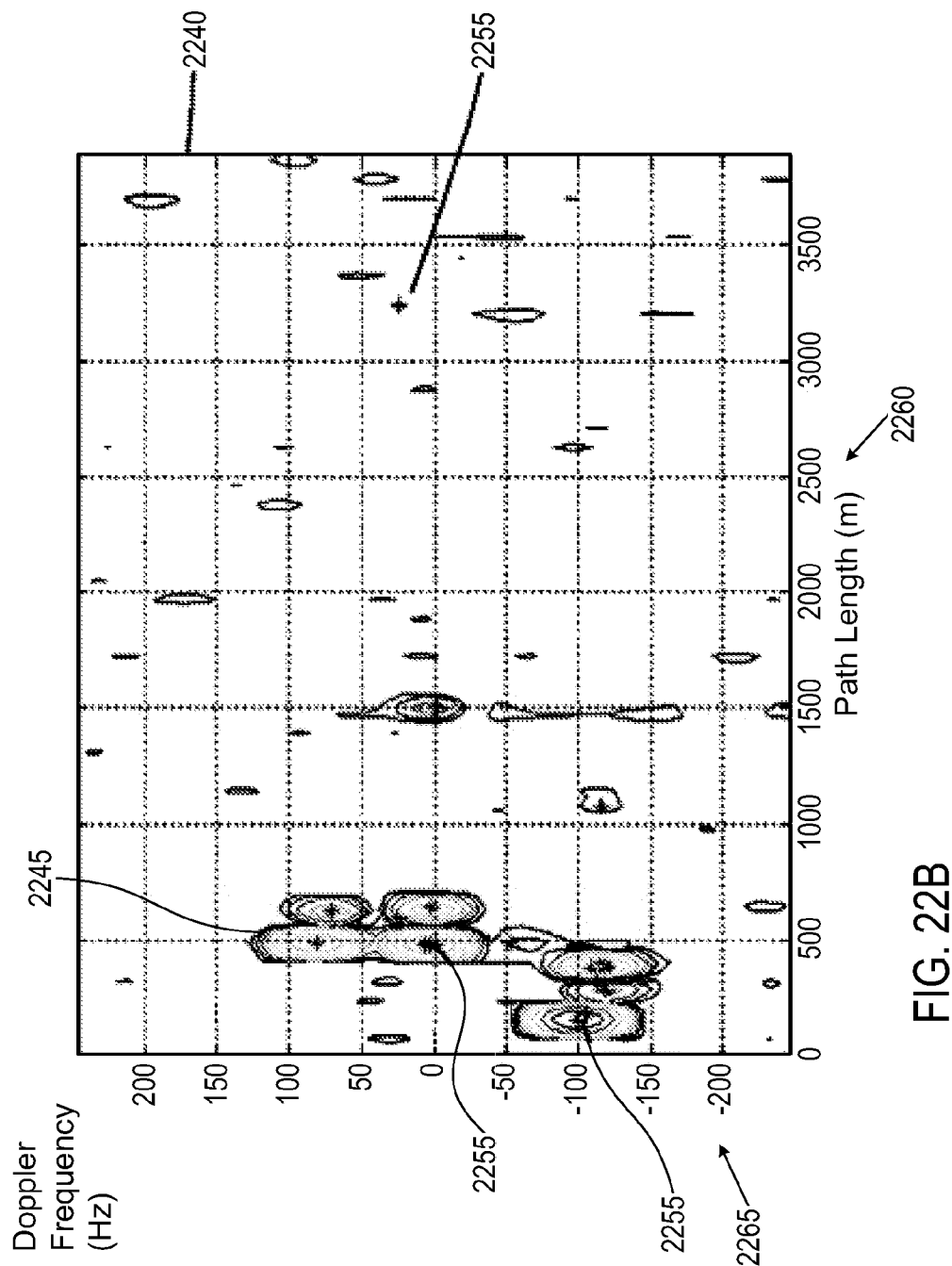
FIG. 22B depicts an exemplary diagram according to embodiments of the present invention.

In an exemplary embodiment, a received signal may undergo time frequency analysis. In such an example, matched filtering may be selected, e.g. with a 60 dB Chebichev window. An integration time for a filter, e.g. a time for which data may be collected, may be, for example, 50 ms. Reference may be made to FIG. 22. An exemplary result, $r(\tau,v)$ of Eqn 9, may be given by FIG. 22. FIG. 22A depicts a three dimensional view 2200 of a result 2215, as a function of a relevant path length (in meters) 2205 and a Doppler frequency (in Hz) 2210. Such a result 2215 may be plotted as, for example, a function of a matched filter response, e.g. in dB. A function may be normalized such that its peak may be, for example, equal to 1. FIG. 22B depicts a contour plot 2240 of the same function as in FIG. 22A, where contours 2245 may be in steps, e.g. of 5 dB to −45 dB, and may be relative to a maximum value. Contours 2255 may be plotted as a Doppler Frequency (in Hz) 2265 versus a path length (in meters) 2260. Actual locations of rays in a path length and/or Doppler plane may be overlaid over a contour plot. Such locations 2255 may be shown on a plot, as in FIG. 22B. In such an example, it may be observed that a location of a function's maxima may coincide with an actual ray location, e.g. no bias and no fading may be considered by a simulation.

Using $r(\tau,v)$ values for peaks of a function may be extracted, as may be depicted by FIG. 20. Other peaks may be within an artifact and/or noise level, and may not be uniquely determined.

Peaks locations of Doppler results may be listed in a table, for example a table listing path lengths and Dopplers. An exemplary table of such a listing may be as follows.

| Path Length | Dopplers |
|---|---|
| 157 m | −100 Hz |
| 280 m | −120 Hz |
| 387 m | −114 Hz |
| 478 m | 0 Hz |
| 486.5 | 80 Hz |
| 635 m | 0 Hz |
| 626.5 m | 73.4 Hz |
| 1500 m | 0 Hz |

Doppler results may be listed with associated path lengths. Rays depicted, for example, by a tabular listing of rays, as above, may be associated with peaks, for example as in the above table. Association may be made, for example, for rays which may be sufficiently strong, e.g. −40 dB relative to a maximal ray. Such rays may be associated with clusters according to an associated proximity to a peak, and may be according to an angular separation.

Rays may be associated, not only by path length and Doppler, but also by cluster, where a cluster may be comprised of a ray and corresponding azimuth and sum power. Such associations may be listed in a table of ray's associations, for example, in the following table.

| | | | Cluster 1 | | | Cluster 2 | | |
|---|---|---|---|---|---|---|---|---|
| Path Length (m) | Doppler (Hz) | Rays | Average Azimuth (°) | Sum Power (dBm) | Rays | Average Azimuth (°) | Sum Power (dBm) | Comments |
| 157 | −100 | (1, 2) | 327 | −37 | | | | |
| 280 | −120 | (4, 5, 6, 7, 8) | 299.86 | −68.8 | | | | |
| 387 | −114 | (13−20) | 309.77 | −60.6 | | | | |
| 478 | 0 | (21−25) | 201.6 | −45.7 | 27 | 160.55 | −53.6 | Rays 24-26 |
| 486.5 | 80 | (21−25) | 201.6 | −45.7 | 27 | 160.55 | −53.6 | too weak |
| 635 | 0 | 30 | 166.5 | −64.6 | 33 | 191.1 | −59 | Rays 28, |
| 626.5 | 73.4 | 30 | 166.5 | −64.6 | 33 | 191.1 | −59 | 29, 31, 32 too weak |
| 1500 | 0 | 35 | 22.06 | −71 | | | | |

A path length, e.g. in meters, may be listed with Doppler results, e.g. in Hz, in a similar manner as depicted by, for example, a table of peaks locations, corresponding to path lengths and Doppler results, respectively. Some rays may arrive, for example, as a cluster, with a same path length and at a similar azimuth. Such rays may be clustered together and may be associated with a peak, for example, as a single value, for which an azimuth may be an average one, e.g. weighted by the power of each ray, and a power may be a sum of a power of substantially all rays. A cluster may include rays, average azimuth, e.g. in degrees, and sum power, e.g. in dBm. Another cluster may also include rays, average azimuth, e.g. in degrees, and sum power, e.g. in dBm. A table of rays' associations may include comments, and may be used for further clarification of entries.

In some embodiments there may be, for example, two peaks within a same resolution gate, e.g. about 80 m, and two rays clusters may be found in such a gate. This may be a case where peaks may be found with path lengths, e.g. of 478 m and 486.5 m, and also for two peaks found with path lengths, e.g. of 635 m and 626 m. It may be difficult to tell which ray, or ray cluster, may correspond with each peak. In such an example, four sets of equations may be formed, according to Eqn 17 and Eqn 18, e.g. assuming no bias, and a bias term may be omitted, with different H matrices:

$$H_1 = \begin{bmatrix} \cos(327°) & \sin(327°) \\ \cos(299.9°) & \sin(299.9°) \\ \cos(309.8°) & \sin(309.8°) \\ \cos(201°) & \sin(201°) \\ \cos(160°) & \sin(160°) \\ \cos(166.5°) & \sin(166.5°) \\ \cos(191.9°) & \sin(191.9°) \\ \cos(22.1°) & \sin(22.1°) \end{bmatrix},$$ [Eqn 23]

$$H_2 = \begin{bmatrix} \cos(327°) & \sin(327°) \\ \cos(299.9°) & \sin(299.9°) \\ \cos(309.8°) & \sin(309.8°) \\ \cos(160°) & \sin(160°) \\ \cos(201°) & \sin(201°) \\ \cos(166.5°) & \sin(166.5°) \\ \cos(191.9°) & \sin(191.9°) \\ \cos(22.1°) & \sin(22.1°) \end{bmatrix},$$

$$H_3 = \begin{bmatrix} \cos(327°) & \sin(327°) \\ \cos(299.9°) & \sin(299.9°) \\ \cos(309.8°) & \sin(309.8°) \\ \cos(201°) & \sin(201°) \\ \cos(160°) & \sin(160°) \\ \cos(191.9°) & \sin(191.9°) \\ \cos(166.5°) & \sin(166.5°) \\ \cos(22.1°) & \sin(22.1°) \end{bmatrix},$$

$$H_4 = \begin{bmatrix} \cos(327°) & \sin(327°) \\ \cos(299.9°) & \sin(299.9°) \\ \cos(309.8°) & \sin(309.8°) \\ \cos(160°) & \sin(160°) \\ \cos(201°) & \sin(201°) \\ \cos(191.9°) & \sin(191.9°) \\ \cos(166.5°) & \sin(166.5°) \\ \cos(22.1°) & \sin(22.1°) \end{bmatrix}$$

Solutions of a set, that may use Eqn 20, may be, for example, without any weighting (W=I), and may yield estimations, e.g. four estimations, which may be checked for consistency, and may be according to Eqn 21. Results may be summarized in the following table of Doppler estimation results.

|  | $H_1$ | $H_2$ | $H_3$ | $H_4$ |
| --- | --- | --- | --- | --- |
| Speed (m/s) | 20.2 | 16.5 | 17.2 | 13.8 |
| Azimuth (°) | 292.2 | 300.2 | 298.1 | 309.2 |
| Residual Error (m/s) | 0.57 | 17.64 | 16.21 | 22.5 |

For each matrix of Eqn 23, $H_1$, $H_2$, $H_3$ and $H_4$, results may be entered and depicted by entries in a Doppler estimation results table, as $H_1$ results, $H_2$ results, $H_3$ results and $H_4$ results. Results may be tabulated with respect to speed, e.g. in meters per second, azimuth, e.g. in degrees and residual error, e.g. in meters per second. With reference to such an exemplary table of Doppler estimation results, $H_1$ may produce a solution with a least residual error, and may deviate, e.g. by 0.2 m/s, from an actual velocity, and by 0.8° from an actual azimuth. A total error may be, for example, 0.6 m/s. An appropriate weighting may further improve such a result.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system for estimating velocity of a mobile station comprising:
   a mobile station capable of transmitting signals;
   a fixed station capable of receiving signals transmitted by at least said mobile station;
   a geographical database, comprising descriptive information about a geographical area;
   a processor operably connected to said fixed station and said geographical database, to
   (a) process a signal sent from said mobile station to said fixed station with data from said geographical database to determine an estimate of velocity of said mobile station;
   (b) further process said signal using time-frequency signal processing;
   (c) further process said signal using ray tracing;
   (d) further process said signal to resolve said signal into component parts and identify scatterers and scatterers' contributions to said components;
   (e) further process said signal to calculate Doppler estimates of rays corresponding to scatterers;

(f) further process said signal using matched filtering of said Doppler estimate and of a shifted Doppler estimate;

(g) determine said shifted Doppler estimate using a range gate; and (h) further process said signal to calculate a best fit of biases to a Doppler spectra, where said Doppler spectra is calculated from said time-frequency analysis using said ray tracing to identify said scatterers, and where said biases are calculated from said Doppler estimate.

2. The system of claim 1, wherein said mobile station further comprises an antenna.

3. The system of claim 1, wherein said processor is located within said fixed station.

4. The system of claim 1, wherein said processor further uses said delayed Doppler estimate and said geographical database to locate scatterers on a map.

5. A system for estimating velocity of a mobile station comprising:

a mobile station capable of transmitting signals;

a fixed station capable of receiving signals transmitted by at least said mobile station;

a geographical database, comprising descriptive information about a geographical area;

a processor operably connected to said fixed station and said geographical database, to (a) process a signal sent from said mobile station to said fixed station with data from said geographical database to determine an estimate of velocity of said mobile station;

(b) further process said signal using time-frequency signal processing;

(c) further process said signal using ray tracing;

(d) further process said signal to resolve said signal into component parts and identify scatterers and scatterers' contributions to said components;

(e) further process said signal to calculate Doppler estimates of rays corresponding to scatterers;

(f) further process said signal using matched filtering of said Doppler estimate and of a shifted Doppler estimate;

(g) determine said shifted Doppler estimate using a range gate;

wherein said processor further processes said signal to determine a weighted least squares estimator, where said weighted least squares estimator is calculated from the velocity and direction of each said scatterer in each said range gate, an estimate of amplitude, phase and bias, and an estimate of standard deviation of errors of said amplitude, phase and bias.

6. The system of claim 1, wherein said processor further processes said signal using a predicted delay profile and a Doppler spread pattern, where said Doppler spread pattern is calculated from a Doppler shift of said signal.

* * * * *